United States Patent
Onozaki et al.

(10) Patent No.: US 12,164,265 B2
(45) Date of Patent: Dec. 10, 2024

(54) MAGNETIC CARRIER, TWO-COMPONENT DEVELOPER, AND DEVELOPER FOR REPLENISHMENT

(71) Applicant: CANON KABUSHIKI KAISHA, Tokyo (JP)

(72) Inventors: Yuto Onozaki, Saitama (JP); Ryuji Murayama, Chiba (JP); Nobuhiro Yoshida, Chiba (JP); Hironori Minagawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 17/585,315

(22) Filed: Jan. 26, 2022

(65) Prior Publication Data

US 2022/0236657 A1    Jul. 28, 2022

(30) Foreign Application Priority Data

Jan. 28, 2021  (JP) .................. 2021-012511
Dec. 27, 2021  (JP) .................. 2021-213013

(51) Int. Cl.
*G03G 9/107* (2006.01)
*G03G 9/087* (2006.01)
(Continued)

(52) U.S. Cl.
CPC ......... *G03G 9/107* (2013.01); *G03G 9/08728* (2013.01); *G03G 9/1133* (2013.01);
(Continued)

(58) Field of Classification Search
CPC .. G03G 9/107; G03G 9/08728; G03G 9/1133; G03G 9/133; G03G 9/0904; G03G 15/09
See application file for complete search history.

(56) References Cited

U.S. PATENT DOCUMENTS 8,211,610 B2 *  7/2012  Yamaguchi .......... G03G 9/1131
                                              430/111.3
8,580,475 B2 * 11/2013  Shoji .................... G03G 9/1136
                                              430/111.32
(Continued)

FOREIGN PATENT DOCUMENTS

EP    2503395 A1    9/2012
EP    2698673 A1    2/2014
(Continued)

OTHER PUBLICATIONS

Fedors, R.F., "A Method for Estimating Both the Solubility Parameters and Molar Volumes of Liquids", Polymer Engineering and Science, Feb. 1974, pp. 147-154, vol. 14, No. 2.

*Primary Examiner* — Peter L Vajda
*Assistant Examiner* — Boone Alexander Evans
(74) *Attorney, Agent, or Firm* — Canon U.S.A., Inc. I.P. Division

(57) ABSTRACT

A magnetic carrier including a magnetic core and a coating resin configured to coat the surface of the magnetic core. The coating resin contains a graft resin A and a graft resin B. The coating resin (i) contains 1.0 mass % or more and 50.0 mass % or less of the graft resin A, and (ii) contains 50.0 mass % or more and 99.0 mass % or less of the graft resin B. The graft resin A has a unit Y1 represented by formula (1) and a unit Y2 represented by formula (2). The graft resin B (i) is a comb-shaped polymer having, as a branch, at least one moiety selected from, for example, a styrene-based polymer moiety and a (meth)acrylate-based polymer moiety, and (ii) contains the polysiloxane structure moiety at a content of 0.1 mass % or less.

(Continued)

(1)

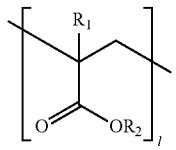

(2)

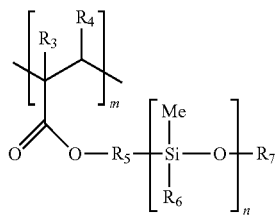

10 Claims, 3 Drawing Sheets

(51) Int. Cl.
  *G03G 9/09* (2006.01)
  *G03G 9/113* (2006.01)
  *G03G 9/13* (2006.01)
  *G03G 15/09* (2006.01)
  *B82Y 40/00* (2011.01)

(52) U.S. Cl.
  CPC ............. *G03G 9/133* (2013.01); *G03G 15/09* (2013.01); *B82Y 40/00* (2013.01); *G03G 9/0904* (2013.01)

(56) References Cited

U.S. PATENT DOCUMENTS

| | | |
|---|---|---|
| 2011/0091802 A1 | 4/2011 | Takahashi et al. |
| 2012/0322004 A1 | 12/2012 | Shoji et al. |
| 2018/0275547 A1 | 9/2018 | Nomiya et al. |

FOREIGN PATENT DOCUMENTS

| | | |
|---|---|---|
| JP | 2002091093 A | 3/2002 |
| JP | 2013003428 A | 1/2013 |
| JP | 2015138230 A | 7/2015 |

\* cited by examiner

MAGNETIC CARRIER, TWO-COMPONENT DEVELOPER, AND DEVELOPER FOR REPLENISHMENT

BACKGROUND OF THE INVENTION

Field of the Invention

The present disclosure relates to a magnetic carrier, a two-component developer, and a developer for replenishment to be used in an image-forming method for visualizing an electrostatic image by employing an electrophotographic method.

Description of the Related Art

The following method has heretofore been employed as an image-forming method of an electrophotographic system. An electrostatic latent image is formed on an electrostatic latent image-bearing member with various units and then toner is caused to adhere to the electrostatic latent image to develop the electrostatic latent image. In the development, the following two-component development system has been widely adopted. A carrier particle called a magnetic carrier imparts a proper quantity of positive or negative charge to the toner through triboelectric charging at the time of mixing with the toner, and the development is performed with the charge as a driving force.

The two-component development system has an advantage, such as good controllability of the performance of a developer, because of the following reason. The system can impart functions, such as the stirring, conveyance, and charging of the developer, to the magnetic carrier, and hence functions are clearly shared between the carrier and the toner. Herein, the magnetic carrier includes a core having a magnetic characteristic for conveying the toner in a developing unit. In addition, the magnetic carrier often has a configuration in which the core is coated with a resin having an ability to impart charge to the toner.

In recent years, along with the technological advance of an electrophotographic field, the long lifetime of the main body of an electrophotographic apparatus has been required at a higher level. The developer is required to achieve a reduction in fogging, a reduction in toner scattering, an image density, and the stabilization of its developability even when used for a long time period.

To achieve the above-mentioned goals, it is required to provide a magnetic carrier that can maintain its charge-imparting ability even when used for a long time period.

In general, when a toner component adheres to a magnetic carrier, the number of the charging sites of the magnetic carrier reduces to reduce its charge-imparting ability. It has been known that a disadvantage, such as a change in image density, occurs at that time. In Japanese Patent Application Laid-Open No. 2002-91093, as a method of improving resistance against the adhesion of the toner component described above (hereinafter referred to as "contamination resistance"), there is a description of an example in which a material having low surface free energy, such as a silicone resin, is used as a coating resin. In general, the material having low surface free energy can suppress the adhesion of the toner component or the like.

However, the material having low surface free energy has such a property as to be liable to be broken by an external force or the like because an interaction between its molecules is weak. Accordingly, when the silicone resin is used as the coating resin of the magnetic carrier, the coating resin may be worn by, for example, a mechanical load occurring at the time of, for example, the stirring or conveyance of the carrier in a developing unit. As a result, the surface resistance of the magnetic carrier reduces, and hence the charge-imparting ability of the magnetic carrier reduces.

In view of the foregoing, to improve the wear resistance of the magnetic carrier, in Japanese Patent Application Laid-Open No. 2015-138230, there is a description of an example in which a silicone-modified resin having trifunctional silicon bonded to a terminal thereof is used.

However, the above-mentioned structure may not improve the contamination resistance of the magnetic carrier because the structure cannot sufficiently reduce the surface free energy of the surface of the magnetic carrier.

In addition, in Japanese Patent Application Laid-Open No. 2013-3428, there is a description of an example in which in the case where a resin having a siloxane structure in a side chain thereof is used, surface free energy between its molecules reduces, and hence the wear resistance becomes insufficient as in the case where the above-mentioned silicone resin is used.

Accordingly, in order for the magnetic carrier to maintain a stable charge-imparting ability when used for a long time period, both of the contamination resistance by which the adhesion of the toner component is suppressed and the wear resistance by which the wear of the coating of the carrier is suppressed may need to be achieved.

SUMMARY OF THE INVENTION

In view of the foregoing, an aspect of the present disclosure is to provide a magnetic carrier that achieves a reduction in fogging, a reduction in toner scattering, a stable image density, and developability even when used for a long time period.

The inventors of the present disclosure have made extensive investigations, and as a result, have found that when a graft resin A and a graft resin B having the following structures are used in combination, both of the contamination resistance and wear resistance of a magnetic carrier are achieved, and the carrier can maintain a stable charge-imparting ability even when used for a long time period.

The graft resin A has such a structure that the same structure as that of the silicone resin is grafted to its main chain. The graft resin B has a structure having high compatibility with the main chain of the graft resin A as a branch. As described above, when only a resin having grafted thereto a siloxane structure, such as the graft resin A, is used, the wear resistance of the magnetic carrier has been insufficient.

However, when the coating resin of the magnetic carrier contains the graft resin A and the graft resin B, the molecular structure of the graft resin A orients so as to be energetically stabilized. Specifically, the siloxane structure of the graft resin A orients toward the surface of the magnetic carrier. As a result, the surface free energy of the magnetic carrier reduces, and hence the contamination resistance thereof is improved.

Further, the main chain of the graft resin A and the branch of the graft resin B have affinities for each other, and hence the wear resistance is improved.

Accordingly, when the graft resin A and the graft resin B having the following structures are used in combination, both of the contamination resistance and wear resistance of the magnetic carrier are achieved, and the carrier can maintain a stable charge-imparting ability even when used for a long time period. As a result, there can be provided a magnetic carrier that achieves a reduction in fogging, a reduction in toner scattering, a stable image density, and developability even when used for a long time period.

That is, according to the present disclosure, there is provided a magnetic carrier including: a magnetic core; and a coating resin configured to coat a surface of the magnetic core, wherein the coating resin contains a graft resin A and a graft resin B, wherein the coating resin (i) contains 1 mass % or more and 50 mass % or less of the graft resin A, and (ii) contains 50 mass % or more and 99 mass % or less of the graft resin B, wherein the graft resin A has a unit Y1 represented by formula (1) and a unit Y2 represented by formula (2), wherein when a mass of the graft resin A is represented by X, a mass of the unit Y1 in the graft resin A is represented by Ma, and a mass of the unit Y2 in the graft resin A is represented by Mb, Ma, Mb, and X satisfy $0.90 \leq (Ma+Mb)/X \leq 1.00$ and $1.00 \leq Ma/Mb \leq 30.0$, and wherein the graft resin B (i) is a comb-shaped polymer having, as a branch, at least one moiety selected from the group consisting of: a styrene-based polymer moiety; a (meth)acrylate-based polymer moiety; and a styrene-acrylate-based polymer moiety, and (ii) is free of a polysiloxane structure moiety or contains the polysiloxane structure moiety at a content of 0.1 mass % or less:

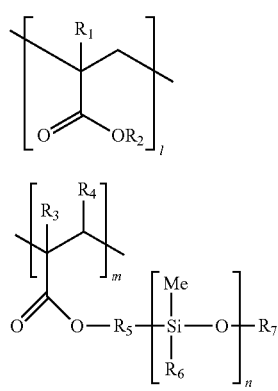

in formula (1) or formula (2), $R_1$ represents H or $CH_3$, $R_2$ represents a hydrocarbon group having 1 or more and 6 or less carbon atoms that may have a substituent, and the substituent is a hydroxy group or a carboxy group, $R_3$ represents H or $CH_3$, $R_4$ represents H or $CH_3$, $R_5$ represents a single bond, or a hydrocarbon group having 1 to 6 carbon atoms, $R_6$ represents a hydrocarbon group having 1 to 10 carbon atoms, $R_7$ represents H, $CH_3$, or $Si(CH_3)_3$, and l and m each represent an integer of 1 or more, and n represents an integer of 2 or more and 150 or less.

Further features of the present disclosure will become apparent from the following description of exemplary embodiments with reference to the attached drawings.

DESCRIPTION OF THE EMBODIMENTS

Figure 1:
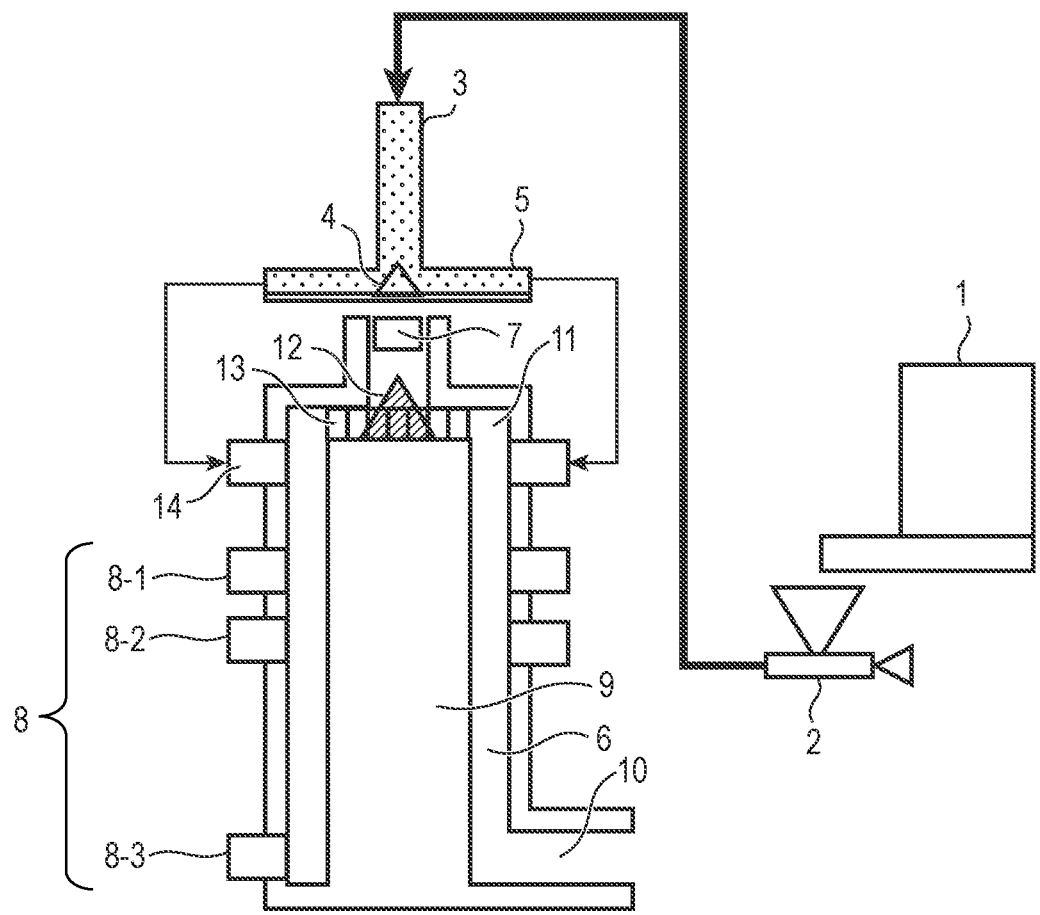
FIG. 1 is a schematic view of a surface treatment apparatus for a toner to be used in a two-component developer according to the present disclosure.

In the present disclosure, the description "∘∘ or more and xx or less" or "from ∘∘ to xx" representing a numerical range means a numerical range including a lower limit and an upper limit that are end points unless otherwise stated.

A magnetic carrier according to the present disclosure includes: a magnetic core; and a coating resin configured to coat a surface of the magnetic core, wherein the coating resin contains a graft resin A and a graft resin B, wherein the coating resin (i) contains 1 mass % or more and 50 mass % or less of the graft resin A, and (ii) contains 50 mass % or more and 99 mass % or less of the graft resin B, wherein the graft resin A has a unit Y1 represented by the following formula (1) and a unit Y2 represented by the following formula (2), wherein when a mass of the graft resin A is represented by X, a mass of the unit Y1 in the graft resin A is represented by "Ma", and a mass of the unit Y2 in the graft resin A is represented by "Mb", the "Ma", the "Mb", and the X satisfy $0.90 \leq (Ma+Mb)/X \leq 1.00$ and $1.00 \leq Ma/Mb \leq 30.0$, and wherein the graft resin B (i) is a comb-shaped polymer having, as a branch, at least one moiety selected from the group consisting of: a styrene-based polymer moiety; a (meth)acrylate-based polymer moiety; and a styrene-acrylate-based polymer moiety, and (ii) is free of a polysiloxane structure moiety or contains the polysiloxane structure moiety at a content of 0.1 mass % or less:

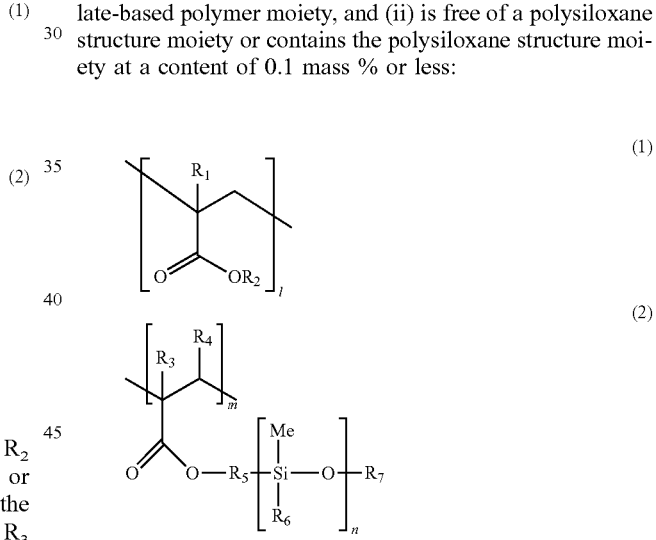

in the formula (1) or the formula (2), $R_1$ represents H or $CH_3$, $R_2$ represents a hydrocarbon group having 1 or more and 6 or less carbon atoms that may have a substituent, and the substituent is a hydroxy group or a carboxy group, $R_3$ represents H or $CH_3$, $R_4$ represents H or $CH_3$, $R_5$ represents a single bond, a hydrocarbon group having 1 or more and 6 or less carbon atoms, or an aromatic group, $R_6$ represents a hydrocarbon group having 1 or more and 10 or less carbon atoms, $R_7$ represents H, $CH_3$, or $Si(CH_3)_3$, and "l" and "m" each represent an integer of 1 or more, and "n" represents an integer of 2 or more and 150 or less.

As described above, when only a resin having low surface free energy, such as a silicone resin, is used as the coating resin of the magnetic carrier, the wear resistance of the magnetic carrier may deteriorate.

The graft resin A has such a structure that the same structure as that of the silicone resin is grafted to its main chain. The graft resin B has a structure having high compatibility with the main chain of the graft resin A as a branch. As described above, when only a resin having grafted thereto a siloxane structure, such as the graft resin A, is used, the wear resistance of the magnetic carrier has been insufficient.

However, when the coating resin of the magnetic carrier contains the graft resin A and the graft resin B, molecules for forming the graft resin A and the graft resin B in the coating resin orient so as to be energetically stabilized. Specifically, the siloxane structure of the graft resin A orients toward the surface of the magnetic carrier. As a result, the surface free energy of the magnetic carrier reduces, and hence the contamination resistance thereof is improved.

Further, the main chain of the graft resin A and the branch of the graft resin B have affinities for each other, and hence the wear resistance is improved.

Accordingly, when the graft resin A and the graft resin B having the following structures are used in combination, both of the contamination resistance and wear resistance of the magnetic carrier are achieved, and the carrier can maintain a stable charge-imparting ability even when used for a long time period.

The graft resin A includes the unit Y1 represented by the formula (1) and the unit Y2 represented by the formula (2). The unit Y2 has a siloxane structure, and the surface free energy is reduced by the siloxane structure. Accordingly, the contamination resistance of the magnetic carrier is improved.

In the formula (1), $R_1$ represents H or $CH_3$, and $R_2$ represents a hydrocarbon group having 1 or more and 6 or less carbon atoms that may have a substituent, and the substituent is a hydroxy group or a carboxy group. As a specific approach to introducing the unit, the unit may be introduced by, for example, copolymerizing any one of the following monomers at the time of the polymerization of the resin A: acrylic acid, methyl acrylate, ethyl acrylate, propyl acrylate, butyl acrylate, hexyl acrylate, cyclobutyl acrylate, cyclohexyl acrylate, cyclopentyl acrylate, methyl methacrylate, ethyl methacrylate, propyl methacrylate, butyl methacrylate, hexyl methacrylate, cyclobutyl methacrylate, cyclohexyl methacrylate, and cyclopentyl methacrylate.

In the formula (2), $R_3$ represents H or $CH_3$, $R_4$ represents H or $CH_3$, $R_5$ represents a single bond, or a hydrocarbon group having 1 or more and 6 or less carbon atoms, $R_6$ represents a hydrocarbon group having 1 or more and 10 or less carbon atoms, and $R_7$ represents H, $CH_3$, or $Si(CH_3)_3$. $R_5$ preferably represents an alkylene group having 1 to 6 carbon atoms. "l" and "m" each represent an integer of 1 or more, and "n" represents an integer of 2 or more and 150 or less. The graft resin A may include the plurality of units Y2. As a specific approach to introducing the unit, the unit may be introduced by, for example, copolymerizing an acrylate or methacrylate having a silicone structure that has been esterified at the time of the polymerization of the resin A.

In the graft resin A, when the mass of the graft resin A, the mass of the unit Y1, and the mass of the unit Y2 are represented by X, "Ma", and "Mb", respectively, the X, the "Ma", and the "Mb" satisfy $0.90 \leq (Ma+Mb)/X \leq 1.00$ and $1.00 \leq Ma/Mb \leq 30.0$.

The relational formulae show that the content of the unit Y1 and the unit Y2 in all the units of the graft resin A is 90 mass % or more, and the mass of the unit Y1 ranges from the same mass as that of the unit Y2 to a value obtained by multiplying the mass of the unit Y2 by 30.

When the ratio "(Ma+Mb)/X" is less than 0.90, the compatibility of the graft resin A with the graft resin B may reduce to deteriorate the wear resistance, or the surface free energy may reduce to deteriorate the contamination resistance.

In addition, when the ratio "Ma/Mb" is less than 1.00, the ratio of the unit Y2 is large. Accordingly, the strength of the coating resin may become insufficient owing to a low intermolecular force between the graft resins resulting from the low surface free energy of the unit to deteriorate the wear resistance. When the ratio "Ma/Mb" is more than 30.0, the ratio of the unit Y2 is small, and hence the surface free energy reduces to deteriorate the contamination resistance.

The ratio of the graft resin A in the coating resin needs to be set to 1.0 mass % or more and 50.0 mass % or less. When the ratio is less than 1.0 mass %, the surface free energy increases, and hence the contamination resistance deteriorates. When the ratio is more than 50.0 mass %, a reduction in intermolecular force resulting from the low surface free energy is more dominant than wear resistance obtained by the interaction of the graft resin A with the graft resin B is, and hence the wear resistance becomes insufficient. The ratio falls within the range of more preferably from 1.0 mass % or more to 30.0 mass % or less, still more preferably from 3.0 mass % or more to 20.0 mass % or less.

The ratio of the graft resin B in the coating resin needs to be set to 50.0 mass % or more and 99.0 mass % or less. When the ratio is less than 50.0 mass %, the resin strength becomes insufficient owing to the low intermolecular force resulting from the low surface free energy, and hence the wear resistance deteriorates. When the ratio is more than 99.0 mass %, the amount of a low-surface free energy component is small, and hence the contamination resistance deteriorates. The ratio falls within the range of more preferably from 70.0 mass % or more to 99.0 mass % or less, still more preferably from 80 mass % or more to 97.0 mass % or less.

In the graft resin A, the "n" represents the number of the siloxane structural units of the unit Y2, and represents the length of the siloxane structure of the unit Y2. The "n" represents an integer of 2 or more and 150 or less. When the "n" represents less than 1, the surface free energy of the surface of the magnetic carrier increases, and hence the contamination resistance may deteriorate. When the "n" represents more than 150, the interaction between the graft resin A and the graft resin B becomes smaller, and hence the wear resistance deteriorates. The "n" more preferably represents 5 or more and 60 or less because the wear resistance and the contamination resistance are improved. The graft resin A may include the plurality of units Y2.

When the atomic percentage of Si of the magnetic carrier of the present disclosure at the time of measurement by X-ray photoelectron spectroscopy (XPS) is represented by $Si_0$, a case in which the following formula is satisfied is preferred.

$$1.0 \leq Si_0 \leq 15.0$$

When the $Si_0$ is 1.0 at % or more, the surface of the magnetic carrier has low surface free energy, and hence the contamination resistance is further improved. When the $Si_0$ is 15.0 at % or less, an intermolecular force between the resins in the surface of the magnetic carrier becomes higher, and hence the wear resistance is further improved.

When the total number of the unit Y1 and the unit Y2 is represented by "s", the graft resin A preferably satisfies the following formula.

$$50 \leq s \leq 250$$

When the "s" is 50 or more, the resin has a molecular weight enough to keep its strength, and the interaction between the graft resin A and the graft resin B becomes higher. Accordingly, the wear resistance and the contamination resistance are further improved.

The graft resin A may have a functional group, such as a nitrogen-containing group, a carboxy group, or a hydroxy group. The presence of the functional group can suppress the charge-up of a developer under a low-humidity environment. In addition, the resin preferably has a hydroxyl value because an effect by a hydrogen bond is exhibited, and hence the wear resistance is further improved.

The acid value of the graft resin A is preferably 0 mgKOH/g or more and 90.0 mgKOH/g or less, more preferably 30.0 mgKOH/g or more and 80.0 mgKOH/g or less, still more preferably 40.0 mgKOH/g or more and 70.0 mgKOH/g or less. When the acid value of the graft resin A is 90.0 mgKOH/g or less, the self-agglomeration of the resin due to an influence of the acid value hardly occurs, and hence the smoothness of the surface (coating film surface) of the resin coating layer of the magnetic carrier hardly reduces. The acid value of the graft resin A may be controlled by: using a monomer having a polar group, such as a carboxy group or a hydroxy group, at the time of the synthesis of the graft resin A; and adjusting the addition amount of the monomer.

The graft resin B preferably includes 75.0 mass % or more of a unit Y3 represented by the following formula (3).

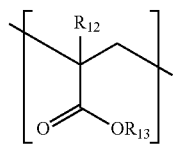

(3)

In the formula (3), $R_8$ represents $CH_3$, and $R_9$ represents a cyclohexyl group, a cycloheptyl group, a cyclooctyl group, a cyclopentyl group, a cyclobutyl group, or a cyclopropyl group.

The graft resin B preferably has an alicyclic hydrocarbon group because the surface (coating film surface of the coating resin) of the magnetic carrier becomes smoother to suppress the adhesion of a toner-derived component, such as a toner particle or an external additive, and hence the contamination resistance is further improved. Only one kind of structure may be incorporated as the unit Y3, or two or more kinds of structures may be incorporated.

The graft resin B preferably includes 1.0 mass % or more and 25.0 mass % or less of a unit Y4 represented by the following formula (4).

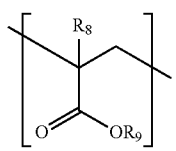

(4)

In the formula (4), $R_{10}$ represents H or $CH_3$, and $R_{11}$ represents a polymer moiety.

When the graft resin B includes the polymer moiety as $R_{11}$, adhesiveness between the resin coating layer and the core of the magnetic carrier is improved. Accordingly, the wear resistance and the ability of the magnetic carrier to impart charge to a toner are improved. Only one kind of structure may be incorporated as the unit Y4, or two or more kinds of structures may be incorporated.

When the graft resin B includes the polymer moiety as $R_{11}$, the resin preferably includes a unit Y5 represented by the formula (5).

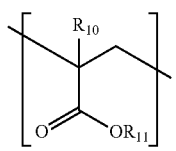

(5)

In the formula (5), $R_{12}$ represents H or $CH_3$, and $R_{13}$ represents a hydrocarbon group having 1 or more and 6 or less carbon atoms.

The polymer moiety in $R_{11}$ is preferably a polymer of at least one kind of monomer selected from the group consisting of: methyl acrylate; methyl methacrylate; butyl acrylate; butyl methacrylate; 2-ethylhexyl acrylate; 2-ethylhexyl methacrylate; styrene; acrylonitrile; and methacrylonitrile. In the case of the polymer, the polymer has an affinity for the main chain of the graft resin A to improve the wear resistance. In addition, the siloxane structure of the graft resin A effectively orients toward the surface of the magnetic carrier. As a result, the surface free energy of the magnetic carrier reduces, and hence the contamination resistance is improved.

The weight-average molecular weight (Mw) of the polymer moiety is preferably 2,000 or more and 10,000 or less, more preferably 3,000 or more and 8,000 or less.

The unit represented by the formula (4) may be introduced into the graft resin B by using a macromonomer having such a polymer moiety as described above at the time of the synthesis of the graft resin B. The macromonomer is preferably used in an amount in the range of from 5.0 parts by mass or more to 40.0 parts by mass or less with respect to 100 parts by mass of all monomers to be used in the synthesis of the graft resin B for coating.

The mixing of the macromonomer into the graft resin B strengthens the entanglement of the molecules of the resin to improve the adhesiveness of the coating resin with the magnetic core. As a result, even when a load is applied to the coating resin by, for example, the stirring member of a developing unit, the coating does not peel. Accordingly, the magnetic carrier maintains a stable charge quantity-imparting ability over a long time period, and hence a satisfactory image can be output.

In terms of the stability of the coating, the weight-average molecular weight (Mw) of the graft resin B is preferably 20,000 or more and 120,000 or less, more preferably 30,000 or more and 100,000 or less.

The acid value of the graft resin B is preferably 0 mgKOH/g or more and 3.0 mgKOH/g or less, more preferably 0 mgKOH/g or more and 2.8 mgKOH/g or less, still more preferably 0 mgKOH/g or more and 2.5 mgKOH/g or less. When the acid value of the graft resin B is 3.0 mgKOH/g or less, the self-agglomeration of the resin due to an influence of the acid value hardly occurs, and hence the smoothness of the surface (coating film surface) of the resin coating layer hardly reduces. The acid value of the graft resin B may be controlled by: using a monomer having a polar group, such as a carboxy group or a sulfo group (sulfonic acid group), at the time of the synthesis of the graft resin B for coating; and adjusting the addition amount of the monomer. However, it is preferred that the monomer having a polar group be not used because the acid value of the graft resin A is preferably low. Even when the resin is synthesized by using only a monomer for forming an ester bond, an acid value may slightly occur in the resin to be synthesized. This is probably because part of the ester bonds decomposes to produce a carboxy group at the time of the synthesis (polymerization) of the resin.

When the SP value of the backbone of the graft resin A is represented by SPa, the SP value of the siloxane structure is represented by SPb, and the SP value of the surface of the magnetic core is represented by SPc, the following relational formulae are preferably satisfied:

when $22.0 < SPc \leq 24.0 (J/cm^3)^{1/2}$, $|SPa-SPc| \leq 3.0 (J/cm^3)^{1/2}$ and $5.0 < |SPb-SPc| (J/cm^3)^{1/2}$, or when $18.0 < SPc \leq 21.0 (J/cm^3)^{1/2}$, $|SPa-SPc| \leq 2.5 (J/cm^3)^{1/2}$ and $4.0 < |SPb-SPc| (J/cm^3)^{1/2}$.

A case in which the above-mentioned relational formulae are satisfied means that an affinity between the backbone of the graft resin A and the surface of the magnetic core is higher than an affinity between the siloxane structure and the surface of the magnetic core. In that case, the backbone of the graft resin A and the surface of the magnetic core effectively have affinities for each other, and hence the graft resin A is brought into close contact with the magnetic core. Thus, the wear resistance is improved.

In addition, with regard to an affinity for the magnetic core, the siloxane structure hardly has an affinity for the core as compared to the backbone of the graft resin A, and hence the molecular structure of the graft resin A orients so as to be energetically stabilized. Specifically, the siloxane structure of the graft resin A orients toward the surface of the magnetic carrier. As a result, the surface free energy of the magnetic carrier reduces, and hence the contamination resistance is improved.

Accordingly, both of the contamination resistance and wear resistance of the magnetic carrier are achieved, and the carrier can maintain a stable charge-imparting ability even when used for a long time period.

The resin coating layer of the present disclosure preferably contains conductive fine particles in its coating resin. The conductive fine particles can appropriately control the specific resistance of the magnetic carrier. As a result, counter charge after the development of a toner can be caused to escape to suppress a blank dot. The content of the conductive fine particles to be added to the coating resin is preferably 0.1 part by mass or more and 20 parts by mass or less with respect to 100 parts by mass of the coating resin. When the content is less than 0.1 part by mass, the effect of the addition of the conductive fine particles is hardly obtained, and when the content is more than 20 parts by mass, concern is raised about a reduction in tinge of the resin due to the separation of the conductive fine particles. Examples of the conductive fine particles include carbon black, titanium oxide, and silver.

In addition, fine particles may be incorporated into the coating resin for the purpose of, for example, improving the ability of the magnetic carrier to impart charge to a toner or improving the releasability thereof. Although the fine particles to be incorporated into the resin coating layer may be fine particles each formed of any one of an organic material and an inorganic material, crosslinked resin fine particles or inorganic fine particles each having such strength as to be capable of retaining its shape at the time of the coating of the magnetic core with the resin are preferred. Examples of a crosslinked resin for forming the crosslinked resin fine particles include a crosslinked polymethyl methacrylate resin, a crosslinked polystyrene resin, a melamine resin, a guanamine resin, a urea resin, a phenol resin, and a nylon resin. In addition, examples of the inorganic fine particles include silica, alumina, and titania.

The content of the fine particles in the resin coating layer is preferably 0.1 part by mass or more and 20 parts by mass or less with respect to 100 parts by mass of the coating resin.

Method of Producing Magnetic Core

A known magnetic particle, such as a magnetite particle, a ferrite particle, or a magnetic material-dispersed resin particle, may be used as the magnetic core of the present disclosure. Of those, a magnetic particle or magnetic material-dispersed resin particle obtained by filling the holes of a magnetic particle of a porous shape with a resin, that is, a magnetic particle containing a magnetic oxide and a resin composition is preferred from the viewpoint that the particle can reduce the specific gravity of the magnetic carrier, and hence can lengthen the lifetime thereof.

When the specific gravity of the magnetic carrier is reduced, a load on, for example, a toner in a developer state in a developing unit is alleviated, and hence the adhesion of a toner constituent component to the surface of the magnetic carrier can be prevented. A load between the particles of the magnetic carrier is also alleviated, thereby leading to further suppression of the peeling, chipping, and abrasion of the resin coating layer. In addition, the dot reproducibility of the toner can be improved, and hence a high-definition image can be obtained.

Although a copolymer resin to be used as the coating resin may be used as the resin to be incorporated into the holes of the magnetic particle of a porous shape, the resin is not limited thereto and a known resin may be used. The copolymer to be used as the coating resin is preferred as a thermoplastic resin to be incorporated into the holes, but in addition thereto, examples of the thermoplastic resin include polystyrene, polymethyl methacrylate, a styrene-acrylate copolymer, a styrene-methacrylate copolymer, a styrene-butadiene copolymer, an ethylene-vinyl acetate copolymer, polyvinyl chloride, polyvinyl acetate, a polyvinylidene fluoride resin, a fluorocarbon resin, a perfluorocarbon resin, a solvent-soluble perfluorocarbon resin, polyvinylpyrrolidone, a petroleum resin, a novolac resin, a saturated alkyl polyester resin, an aromatic polyester resin, such as polyethylene terephthalate, polybutylene terephthalate, or polyarylate, a polyamide resin, a polyacetal resin, a polycarbonate resin, a polyether sulfone resin, a polysulfone resin, a polyphenylene sulfide resin, and a polyether ketone resin.

As a thermosetting resin, there are given, for example, the following resins: a phenol resin, a modified phenol resin, a maleic resin, an alkyd resin, an epoxy resin, an acrylic resin, an unsaturated polyester obtained by the polycondensation of maleic anhydride, terephthalic acid, and a polyhydric alcohol, a urea resin, a melamine resin, a urea-melamine resin, a xylene resin, a toluene resin, a guanamine resin, a melamine-guanamine resin, an acetoguanamine resin, a glyptal resin, a furan resin, a silicone resin, polyimide, a polyamide imide resin, a polyether imide resin, and a polyurethane resin.

An example of a method of filling the voids of a ferrite particle having a porous shape with a resin component is a method including diluting the resin component with a solvent and adding the porous magnetic core particle to the diluted liquid. The solvent to be used herein only needs to be capable of dissolving each resin component. In the case of an organic solvent-soluble resin, an organic solvent, such as toluene, xylene, cellosolve butyl acetate, methyl ethyl ketone, methyl isobutyl ketone, or methanol, only needs to be used. In addition, in the case of a water-soluble resin component or an emulsion-type resin component, water only needs to be used. An example of a method of adding the resin component diluted with the solvent to the inside of the porous magnetic core particle is a method including: impregnating the particle with the resin component by any one of application methods, such as a dipping method, a spray method, a brush coating method, a fluidized bed, and a kneading method; and then volatilizing the solvent. When a thermosetting resin is filled into the voids, the solvent is volatilized, and then the temperature of the resin to be used is increased to the temperature at which the resin to be used cures to perform a curing reaction.

Meanwhile, a specific method of producing a magnetic material-dispersed resin particle is, for example, the following method. The particle may be obtained by, for example, performing kneading so that a submicron magnetic material, such as iron powder, a magnetite particle, or a ferrite particle, may be dispersed in a thermoplastic resin, pulverizing the kneaded product to a desired magnetic carrier particle diameter, and subjecting the pulverized product to thermal or mechanical sphering treatment as required. In addition, the particle may be produced by dispersing the magnetic material in a monomer and polymerizing the monomer to form a resin.

Examples of the resin in this case include resins such as a vinyl resin, a polyester resin, an epoxy resin, a phenol resin, a urea resin, a polyurethane resin, a polyimide resin, a cellulose resin, a silicone resin, an acrylic resin, and a polyether resin. The resins may be used alone or as a mixed resin thereof. In particular, the phenol resin is preferred because the resin improves the strength of the magnetic core. The true density and specific resistance of the core may be adjusted by adjusting the amount of the magnetic material. Specifically, in the case of a magnetic material particle, the particle is preferably added at 70 mass % or more and 95 mass % or less with respect to the magnetic carrier.

The magnetic core preferably has a 50% particle diameter (D50) on a volume basis of 20 μm or more and 80 μm or less because the core can be uniformly coated with the coating resin, and hence the density of a developer magnetic brush for preventing the adhesion of the carrier and obtaining a high-quality image becomes moderate.

With regard to the specific resistance of the magnetic core, the specific resistance value thereof in an electric field intensity of 1,000 (V/cm) is preferably $1.0 \times 10^5$ (Ω·cm) or more and $1.0 \times 10^{14}$ (Ω·cm) or less because satisfactory developability is obtained.

Method of Producing Magnetic Carrier

A method for the treatment of coating the surface of the magnetic core with the coating resin is not particularly limited, and the treatment may be performed by a known method. For example, a so-called dipping method including volatilizing the solvent of a coating resin solution, while stirring the magnetic core and the coating resin solution, to coat the surface of the magnetic core with the coating resin is available. Specific examples of an apparatus to be used in the method include a universal mixing and stirring machine (manufactured by Fuji Paudal Co., Ltd.) and a Nauta mixer (manufactured by Hosokawa Micron Corporation). In addition, a method including spraying the coating resin solution from a spray nozzle, while forming a fluidized bed, to coat the surface of the magnetic core with the coating resin is available. Specific examples of an apparatus to be used in the method include SPIRA COTA (manufactured by Okada Seiko Co., Ltd.) and SPIR-A-FLOW (manufactured by Freund Corporation). In addition, a method including coating the magnetic carrier core with the coating resin in a particle state in a dry manner is available. A specific example of the method may be a treatment method including using an apparatus such as HYBRIDIZER (manufactured by Nara Machinery Co., Ltd.), MECHANOFUSION (manufactured by Hosokawa Micron Corporation), HIGH FLEX GRAL (manufactured by Fukae Powtec K.K.), or THETA COMPOSER (manufactured by Tokuju Corporation).

Magnetic Carrier

Next, the magnetic carrier is described.

The magnetization of the magnetic carrier under a magnetic field of $5,000/4\pi$ (kA/m) is preferably 40 ($Am^2/kg$) or more and 70 ($Am^2/kg$) or less. When the magnetization of the magnetic carrier falls within the range, a magnetic binding force on a developing sleeve is moderate, and hence the occurrence of the adhesion of the carrier can be more satisfactorily suppressed. In addition, a stress to be applied to a toner in a magnetic brush can be reduced, and hence the deterioration of the toner and the adhesion thereof to any other member can be satisfactorily suppressed.

In addition, the magnetization of the magnetic carrier may be appropriately adjusted by the amount of a resin to be incorporated thereinto.

The residual magnetization of the magnetic carrier is preferably 20.0 ($Am^2/kg$) or less, more preferably 10.0 ($Am^2/kg$) or less. When the residual magnetization of the magnetic carrier falls within the ranges, particularly satisfactory flowability as a developer is obtained, and hence satisfactory dot reproducibility is obtained.

The true density of the magnetic carrier is preferably 2.5 ($g/cm^3$) or more and 5.5 ($g/cm^3$) or less, more preferably 3.0 ($g/cm^3$) or more and 5.0 ($g/cm^3$) or less. A two-component developer including the magnetic carrier having a true density in the ranges applies a small load to its toner, and hence suppresses the adhesion of a toner constituent component to the magnetic carrier. In addition, to achieve both of satisfactory developability and the prevention of the adhesion of the carrier in a low electric field intensity, a true density in the ranges is preferred for the magnetic carrier.

The magnetic carrier preferably has a 50% particle diameter (D50) on a volume basis of 21 μm or more and 81 μm or less from the viewpoints of the ability of the carrier to impart charge to a toner, the suppression of the adhesion of the carrier to an image region, and an improvement in image quality. The particle diameter is more preferably 25 μm or more and 60 μm or less.

Next, the configuration of a toner preferred for achieving the aspect in the present disclosure is described in detail below.

Binder Resin

In the toner particle of the present disclosure, for example, the following polymers may each be used as a binder resin:

homopolymers of styrene and a substitution product thereof, such as polystyrene, poly-p-chlorostyrene, and polyvinyltoluene; styrene-based copolymers, such as a styrene-p-chlorostyrene copolymer, a styrene-vinyltoluene copolymer, a styrene-vinylnaphthalene copolymer, a styrene-acrylate copolymer, and a styrene-methacrylate copolymer; hybrid resins each obtained by the mixing of a styrene-based copolymer resin, a polyester resin, or a polyester resin, and a vinyl-based resin, or the reaction of part of both the resins; and polyvinyl chloride, a phenol resin, a natural modified phenol resin, a natural resin-modified maleic acid resin, an acrylic resin, a methacrylic resin, polyvinyl acetate, a silicone resin, a polyester resin, polyurethane, a polyamide resin, a furan resin, an epoxy resin, a xylene resin, a polyethylene resin, and a polypropylene resin. Of those, a polyester resin is preferably used as a main component from the viewpoint of low-temperature fixability.

A polyhydric alcohol (alcohol that is dihydric or trihydric or more) and a polyvalent carboxylic acid (carboxylic acid that is divalent or trivalent or more), or an acid anhydride or lower alkyl ester thereof are used as monomers to be used in the polyester unit of the polyester resin. Herein, to produce a branched polymer for expressing "strain curability," partial crosslinking in a molecule of an amorphous resin is effective. To perform the partial crosslinking, a polyfunctional compound that is trivalent or more is preferably used. Accordingly, the resin preferably contains, as a raw material monomer for its polyester unit, a carboxylic acid that is trivalent or more, or an acid anhydride or lower alkyl ester thereof, and/or an alcohol that is trihydric or more.

The following polyhydric alcohol monomers may each be used as a polyhydric alcohol monomer to be used in the polyester unit of the polyester resin.

Examples of the dihydric alcohol component include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, a bisphenol represented by the formula (A) and derivatives thereof:

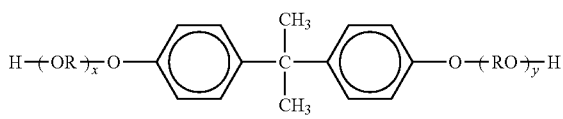

(A)

where R represents an ethylene or propylene group, "x" and "y" each represent an integer of 0 or more, and the average of x+y is 0 or more and 10 or less, and a diol represented by the formula (B):

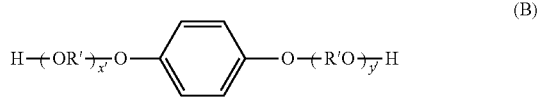

(B)

where R' represents —CH$_2$CH$_2$—, —CH$_2$—CH(CH$_3$)—, or —CH$_2$—C(CH$_3$)$_2$—, x' and y' each represent an integer of 0 or more, and the average of x+y is from κ to 10.

Examples of the alcohol component that is trihydric or more include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Of those, glycerol, trimethylolpropane, and pentaerythritol are preferably used. Those dihydric alcohols and alcohols that are trihydric or more may be used alone or in combination thereof.

The following polyvalent carboxylic acid monomers may each be used as a polyvalent carboxylic acid monomer to be used in the polyester unit of the polyester resin.

Examples of the divalent carboxylic acid component include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, isooctylsuccinic acid, acid anhydrides thereof, and lower alkyl esters thereof. Of those, maleic acid, fumaric acid, terephthalic acid, and n-dodecenylsuccinic acid are preferably used.

Examples of the carboxylic acid that is trivalent or more, the acid anhydride thereof, or the lower alkyl ester thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof, and lower alkyl esters thereof. Of those, in particular, 1,2,4-benzenetricarboxylic acid, that is, trimellitic acid or a derivative thereof is preferably used because the acid or the derivative thereof is inexpensive, and its reaction is easy to control. The divalent carboxylic acids and the like, and the carboxylic acids that are trivalent or more described above may be used alone or in combination thereof.

A method of producing the polyester unit of the present disclosure is not particularly limited, and a known method may be used. For example, the alcohol monomer and the carboxylic acid monomer described above are simultaneously loaded into a reaction vessel, and are polymerized through an esterification reaction or a transesterification reaction, and a condensation reaction to produce the polyester resin. In addition, a polymerization temperature, which is not particularly limited, preferably falls within the range of from 180° C. or more to 290° C. or less. At the time of the polymerization of the polyester unit, a polymerization catalyst, such as a titanium-based catalyst, a tin-based catalyst, zinc acetate, antimony trioxide, or germanium dioxide, may be used. In particular, the binder resin of the present disclosure is more preferably a polyester unit polymerized by using a tin-based catalyst.

In addition, it is preferred that the acid value of the polyester resin be 5 mgKOH/g or more and 20 mgKOH/g or less, and the hydroxyl value thereof be 20 mgKOH/g or more and 70 mgKOH/g or less from the viewpoint of fogging resistance because the moisture adsorption amount of the resin under a high-temperature and high-humidity environment is suppressed, and hence the non-electrostatic adhesive force thereof can be suppressed to a low level.

In addition, a mixture of a low-molecular weight resin and a high-molecular weight resin may be used as the binder resin. A content ratio between the high-molecular weight resin and the low-molecular weight resin is preferably 40/60 or more and 85/15 or less on a mass basis from the viewpoints of low-temperature fixability and hot offset resistance.

Release Agent

Examples of the wax to be used in the toner of the present disclosure include: a hydrocarbon-based wax, such as low-molecular-weight polyethylene, low-molecular-weight polypropylene, an alkylene copolymer, a microcrystalline wax, a paraffin wax, or a Fischer-Tropsch wax; an oxide of a hydrocarbon-based wax, such as an oxidized polyethylene wax or a block copolymerization product thereof; a wax containing a fatty acid ester as a main component, such as a carnauba wax; and a wax obtained by subjecting part or all of a fatty acid ester to deacidification, such as a deacidified carnauba wax. Further examples thereof include: a saturated straight-chain fatty acid, such as palmitic acid, stearic acid, or montanic acid; an unsaturated fatty acid, such as brassidic acid, eleostearic acid, or parinaric acid; a saturated alcohol, such as stearyl alcohol, aralkyl alcohol, behenyl alcohol, carnaubyl alcohol, ceryl alcohol, or melissyl alcohol; a polyhydric alcohol, such as sorbitol; an ester formed of a fatty acid, such as palmitic acid, stearic acid, behenic acid, or montanic acid, and an alcohol, such as stearyl alcohol, aralkyl alcohol, behenyl alcohol, carnaubyl alcohol, ceryl alcohol, or melissyl alcohol; a fatty acid amide, such as linoleamide, oleamide, or lauramide; a saturated fatty acid bisamide, such as methylenebisstearamide, ethylenebiscapramide, ethylenebislauramide, or hexamethylenebisstearamide; an unsaturated fatty acid amide, such as ethylenebisoleamide, hexamethylenebisoleamide, N,N'-dioleyladipamide, or N,N'-dioleylsebacamide; an aromatic bisamide, such as m-xylenebisstearamide or N,N'-distearylisophthalamide; an aliphatic metal salt (generally referred to as metal soap), such as calcium stearate, calcium laurate, zinc stearate, or magnesium stearate; a wax obtained by grafting an aliphatic hydrocarbon-based wax with a vinyl-based monomer, such as styrene or acrylic acid; a partially esterified product formed of a fatty acid and a polyhydric alcohol, such as behenic acid monoglyceride; and a methyl ester compound having a hydroxyl group obtained by subjecting a vegetable oil and fat to hydrogenation.

Of those waxes, a hydrocarbon-based wax, such as a paraffin wax or a Fischer-Tropsch wax, or a fatty acid ester-based wax, such as a carnauba wax, is preferred from the viewpoint of improving the low-temperature fixability and fixation separability of the toner. In the present disclosure, a hydrocarbon-based wax is more preferred because the hot offset resistance of the toner is further improved.

In the present disclosure, the wax is preferably used in an amount of 3 parts by mass or more and 8 parts by mass or less per 100 parts by mass of the binder resin.

In addition, the peak temperature of the highest endothermic peak of the wax in an endothermic curve at the time of temperature increase measured with a differential scanning calorimeter (DSC) is preferably 45° C. or more and 140° C. or less. The peak temperature of the highest endothermic peak of the wax preferably falls within the range because both of the storage stability and hot offset resistance of the toner can be achieved.

Colorant

The toner particle in the present disclosure may contain a colorant. Examples of the colorant include the following colorants.

A black colorant is, for example, carbon black or a colorant toned to a black color with a yellow colorant, a magenta colorant, and a cyan colorant. A pigment may be used alone as the colorant, but it is more preferred to use a dye and a pigment in combination to improve the color definition from the viewpoint of the image quality of a full-color image.

As a pigment for magenta toner, there are given, for example: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, or 282; C.I. Pigment Violet 19; and C.I. Vat Red 1, 2, 10, 13, 15, 23, 29, or 35.

As a dye for magenta toner, there are given, for example: oil-soluble dyes, such as: C.I. Solvent Red 1, 3, 8, 23, 24, 25, 27, 30, 49, 81, 82, 83, 84, 100, 109, or 121; C.I. Disperse Red 9; C.I. Solvent Violet 8, 13, 14, 21, or 27; and C.I. Disperse Violet 1; and basic dyes, such as: C.I. Basic Red 1, 2, 9, 12, 13, 14, 15, 17, 18, 22, 23, 24, 27, 29, 32, 34, 35, 36, 37, 38, 39, or 40; and C.I. Basic Violet 1, 3, 7, 10, 14, 15, 21, 25, 26, 27, or 28.

As a pigment for cyan toner, there are given, for example: C.I. Pigment Blue 2, 3, 15:2, 15:3, 15:4, 16, or 17; C.I. Vat Blue 6; C.I. Acid Blue 45; and a copper phthalocyanine pigment in which a phthalocyanine skeleton is substituted with 1 to 5 phthalimidomethyl groups.

A dye for cyan toner is, for example, C.I. Solvent Blue 70.

As a pigment for yellow toner, there are given, for example: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, or 185; and C.I. Vat Yellow 1, 3, or 20.

A dye for yellow toner is, for example, C.I. Solvent Yellow 162.

Those colorants may be used alone or as a mixture thereof, and may each be used under the state of a solid solution. The colorant is selected in terms of a hue angle, chroma, lightness, light resistance, OHP transparency, and dispersibility in the toner.

The content of the colorant is preferably 0.1 part by mass or more and 30.0 parts by mass or less with respect to 100 parts by mass of the total amount of the resin component.

Inorganic Fine Particles

The toner preferably contains inorganic fine particles for the main purpose of improving its flowability and chargeability, and a mode in which the fine particles adhere to the surfaces of the toner particles is preferred.

Silica particles having a highest peak particle diameter on a number distribution basis of 80 nm or more and 200 nm or less are preferred as the inorganic fine particles serving as spacer particles for improving releasability between the toner and the magnetic carrier. The highest peak particle diameter on a number distribution basis is more preferably 100 nm or more and 150 nm or less in order that the inorganic fine particles may be more satisfactorily suppressed from separating from the toner while being caused to function as spacer particles.

In addition, to improve the flowability of the toner, the toner preferably contains inorganic fine particles having a highest peak particle diameter on a number distribution basis of 20 nm or more and 50 nm or less, and a mode in which the fine particles are used in combination with the silica particles is also preferred.

Further, any other external additive may be added to the toner particle with a view to improving the flowability and transferability of the toner. The external additive to be externally added to the surface of the toner particle preferably contains inorganic fine particles each formed of, for example, titanium oxide, alumina oxide, or silica, and a plurality of kinds of external additives may be used in combination.

The total content of the external additives is preferably 0.3 part by mass or more and 5.0 parts by mass or less, more preferably 0.8 part by mass or more and 4.0 parts by mass or less with respect to 100 parts by mass of the toner particle. The content of the silica particles having a highest peak particle diameter on a number distribution basis of 80 nm or more and 200 nm or less out of the external additives is preferably 0.1 part by mass or more and 2.5 parts by mass or less, more preferably 0.5 part by mass or more and 2.0 parts by mass or less with respect to 100 parts by mass of the toner particle. When the content falls within the ranges, the effect of the particles serving as spacer particles becomes more significant.

In addition, the surfaces of the silica particles or the inorganic fine particles to be used as an external additive are preferably subjected to hydrophobic treatment. The hydrophobic treatment is preferably performed with: coupling agents, such as various titanium coupling agents and silane coupling agents; fatty acids and metal salts thereof; silicone oils; or combinations thereof.

Examples of the titanium coupling agent include tetrabutyl titanate, tetraoctyl titanate, isopropyltriisostearoyl titanate, isopropyltridecylbenzenesulfonyl titanate, and bis(dioctylpyrophosphate)oxyacetate titanate.

In addition, examples of the silane coupling agent include γ-(2-aminoethyl)aminopropyltrimethoxysilane, γ-(2-aminoethyl)aminopropylmethyldimethoxysilane, γ-methacryloxypropyltrimethoxysilane, N-β-(N-vinylbenzylaminoethyl)-γ-aminopropyltrimethoxysilane hydrochloride, hexamethyldisilazane, methyltrimethoxysilane, butyltrimethoxysilane, isobutyltrimethoxysilane, hexyltrimethoxysilane, octyltrimethoxysilane, decyltrimethoxysilane, dodecyltrimethoxysilane, phenyltrimethoxysilane, o-methylphenyltrimethoxysilane, and p-methylphenyltrimethoxysilane.

Examples of the fatty acid include long-chain fatty acids, such as undecylic acid, lauric acid, tridecylic acid, dodecylic acid, myristic acid, palmitic acid, pentadecylic acid, stearic acid, heptadecylic acid, arachic acid, montanoic acid, oleic acid, linoleic acid, and arachidonic acid. As a metal of a metal salt of such fatty acid, there are given, for example, zinc, iron, magnesium, aluminum, calcium, sodium, and lithium.

Examples of the silicone oil include a dimethylsilicone oil, a methylphenylsilicone oil, and an amino-modified silicone oil.

The hydrophobic treatment is preferably performed by adding a hydrophobic treatment agent to particles to be treated at 1 mass % or more and 30 mass % or less (more preferably 3 mass % or more and 7 mass % or less) with respect to the particles to be treated to coat the particles to be treated.

Although the degree of hydrophobicity of the hydrophobic-treated external additive is not particularly limited, the degree of hydrophobicity after the treatment is preferably, for example, 40 or more and 98 or less. The degree of hydrophobicity represents the wettability of the sample to methanol, and is an indicator of the hydrophobicity thereof.

When the magnetic carrier of the present disclosure is mixed with the toner to be used as a two-component developer, the mixing ratio of the carrier at the time is set to 2 mass % or more and 15 mass % or less, preferably 4 mass % or more and 13 mass % or less in terms of the concentration of the toner in the developer because satisfactory results are typically obtained. When the toner concentration is less than 2 mass %, an image density is liable to reduce, and when the toner concentration is more than 15 mass %, fogging or the scattering of the toner in an image-forming apparatus is liable to occur.

In addition, the magnetic carrier of the present disclosure is used as a developer for replenishment. In a developer for replenishment to be replenished into a developing unit in accordance with a reduction in toner concentration of a two-component developer in the developing unit, the amount of its toner is 2 parts by mass or more and 50 parts by mass or less with respect to 1 part by mass of its magnetic carrier for replenishment.

Next, an image-forming apparatus including a developing device using the magnetic carrier, two-component developer, and developer for replenishment of the present disclosure is described by taking an example. However, the developing device to be used in a developing method of the present disclosure is not limited thereto.

Image-Forming Method

Figure 2:
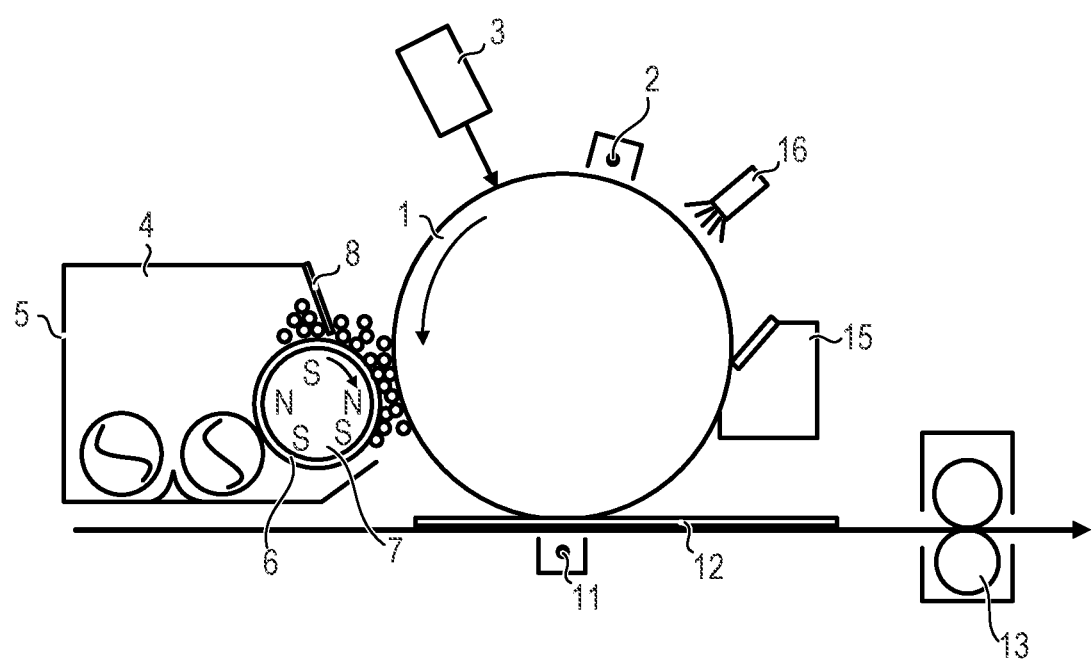
FIG. 2 is a schematic view of an image-forming apparatus in which a magnetic carrier according to the present disclosure is used.

In FIG. 2, an electrostatic latent image-bearing member 1 rotates in a direction indicated by an arrow in the figure. The electrostatic latent image-bearing member 1 is charged by a charger 2 that is a charging unit, and an electrostatic latent image is formed on the surface of the charged electrostatic latent image-bearing member 1 by exposure to light from an exposing unit 3 that is an electrostatic latent image-forming unit. A developing unit 4 has a developer container 5 for storing a two-component developer, and a developer-carrying member 6 is arranged therein under a rotatable state. In addition, the developer-carrying member 6 has included therein magnets 7 serving as magnetic field-generating units. At least one of the magnets 7 is arranged at such a position as to face the latent image-bearing member. The two-component developer is held on the developer-carrying member 6 by the magnetic field of the magnets 7, and the amount of the two-component developer is regulated by a regulating member 8, followed by the conveyance thereof to a developing portion facing the electrostatic latent image-bearing member 1. In the developing portion, a magnetic brush is formed by the magnetic field generated by the magnets 7. After that, a developing bias obtained by superimposing an AC electric field on a DC electric field is applied to visualize the electrostatic latent image as a toner image. The toner image formed on the electrostatic latent image-bearing member 1 is electrostatically transferred onto a recording medium (transfer material) 12 by a transfer charger 11. Herein, the following step may be performed: as illustrated in FIG. 2, the toner image is transferred from the electrostatic latent image-bearing member 1 onto an intermediate transfer body 9 once, and is then electrostatically transferred onto the recording medium 12.

After that, the recording medium 12 is conveyed to a fixing unit 13 where the medium is heated and pressurized. Thus, the toner of the developer is fixed onto the recording medium 12. After that, the recording medium 12 is discharged as an output image to the outside of the apparatus. After the transferring step, the toner remaining on the electrostatic latent image-bearing member 1 is removed by a cleaner 15. After that, the electrostatic latent image-bearing member 1 cleaned by the cleaner 15 is electrically initialized by the application of light from a pre-exposing unit 16, and the above-mentioned image-forming operation is repeated.

Figure 3:
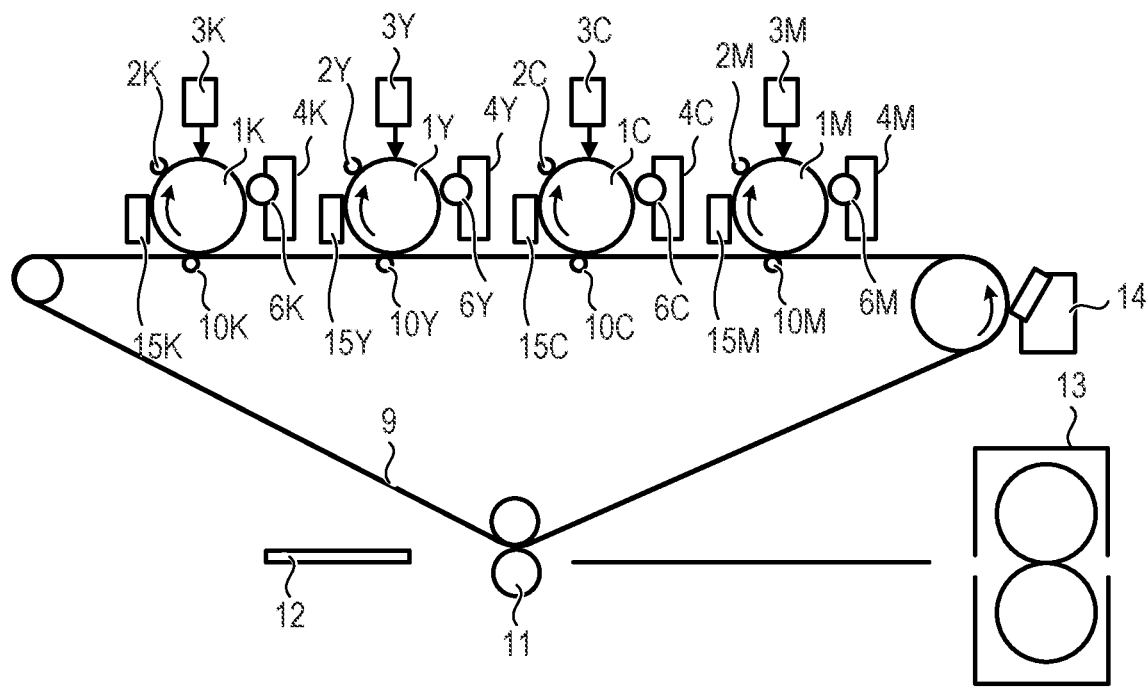
FIG. 3 is a schematic view of an image-forming apparatus in which the magnetic carrier according to the present disclosure is used.

FIG. 3 is an illustration of an example of a schematic view of a case in which the image-forming method of the present disclosure is applied to a full-color image-forming apparatus.

The arrangement of image-forming units represented by, for example, K, Y, C, and M, and arrows indicating their rotation directions in the figure are by no means limited thereto. Incidentally, K, Y, C, and M mean black, yellow, cyan, and magenta, respectively. In FIG. 2, electrostatic latent image-bearing members 1K, 1Y, 1C, and 1M each rotate in the direction indicated by the arrow in the figure. The respective electrostatic latent image-bearing members are charged by chargers 2K, 2Y, 2C, and 2M that are charging units. Electrostatic latent images are formed on the surfaces of the respective charged electrostatic latent image-bearing members by exposure to light from exposing units 3K, 3Y, 3C, and 3M that are electrostatic latent image-forming units. After that, the electrostatic latent images are visualized as toner images by two-component developers carried on developer-carrying members 6K, 6Y, 6C, and 6M included in developing units 4K, 4Y, 4C, and 4M that are developing units. The toners of the developers remaining on the respective electrostatic latent image-bearing members are removed by cleaners 15K, 15Y, 15C, and 15M, respectively. Further, the toner images are transferred onto the intermediate transfer body 9 by intermediate transfer chargers 10K, 10Y, 10C, and 10M that are transferring units. Further, the toner images are transferred onto the recording medium 12 by the transfer charger 11 that is a transferring unit. The toner images on the recording medium 12 are fixed under heat and pressure by the fixing unit 13 that is a fixing unit, and the medium is output as an image. Then, an intermediate transfer member cleaner 14 that is a cleaning member for the intermediate transfer member 9 recovers transfer residual toners and the like. In the developing method of the present disclosure, specifically, the development is preferably performed under a state in which while an AC voltage is applied to each of the developer-carrying members to form an AC electric field in a developing region, a magnetic brush is brought into contact with a photosensitive member. A distance (S-D distance) between the developer-carrying member (developing sleeve) 6 and a photosensitive drum is preferably 100 μm or more and 1,000 μm or less in terms of the prevention of the adhesion of the carrier and an improvement in dot reproducibility. When the distance is less than 100 μm, the supply of the developer is liable to be insufficient, and hence an image density reduces. When the distance is more than 1,000 μm, lines of magnetic force from a magnetic pole S1 spread to reduce the density of the magnetic brush. Thus, the dot reproducibility deteriorates, or a binding force on the magnetic coat carrier weakens to make the adhesion of the carrier more liable to occur.

The peak-to-peak voltage (Vpp) of the AC electric field is 300 V or more and 3,000 V or less, preferably 500 V or more and 1,800 V or less. In addition, the frequency of the electric field is 500 Hz or more and 10,000 Hz or less, preferably 1,000 Hz or more and 7,000 Hz or less, and an electric field having such peak-to-peak voltage and frequency may be appropriately selected and used in accordance with a process. In this case, the waveform of an AC bias for forming the AC electric field is, for example, a triangular wave, a rectangular wave, a sinusoidal wave, or a waveform whose duty ratio has been changed. To adapt to a change in speed at which the toner image is formed, the development is sometimes preferably performed by applying, to each of the developer-carrying members, a developing bias voltage having a discontinuous AC bias voltage (intermittent AC superimposed voltage). When the applied voltage is less than 300 V, a sufficient image density is hardly obtained, and the fogging toner of a non-image portion cannot be satisfactorily recovered in some cases. In addition, when the applied voltage is more than 3,000 V, the latent image may be disturbed through the magnetic brush to cause a reduction in image quality.

When a two-component developer including a satisfactorily charged toner is used, a fog-removing voltage (Vback) can be reduced, and hence the primary charging of a photosensitive member can be reduced. Thus, the lifetime of the photosensitive member can be lengthened. The Vback is preferably 200 V or less, more preferably 150 V or less, though the preferred value varies depending on a developing system. A contrast potential of 100 V or more and 400 V or less is preferably used so that a sufficient image density may be obtained.

In addition, the configuration of each of the electrostatic latent image-bearing members may be the same as that of a photosensitive member typically used in an image-forming apparatus, though its process speed is affected when the frequency is lower than 500 Hz. For example, there is given a photosensitive member having a configuration in which a conductive layer, an undercoat layer, a charge-generating layer, and a charge-transporting layer, and as required, a charge-injecting layer are sequentially arranged on a conductive substrate made of, for example, aluminum or SUS.

The conductive layer, the undercoat layer, the charge-generating layer, and the charge-transporting layer may be those typically used in a photosensitive member. For example, the charge-injecting layer or a protective layer may be used as the outermost surface layer of the photosensitive member.

Measurement of Pore Diameter and Pore Volume of Porous Magnetic Core

The pore diameter distribution of the porous magnetic core is measured by a mercury penetration method.

A measurement principle is as described below.

In the measurement, a pressure to be applied to mercury is changed and the amount of mercury that penetrates a pore at the pressure is measured. The condition under which mercury can penetrate the pore may be represented by the following equation in consideration of the equilibrium of forces: PD=-4σ cos θ where P represents a pressure, D represents the diameter of the pore, and θ and σ represent the contact angle and surface tension of mercury, respectively. When the contact angle and the surface tension are constants, the pressure P and the diameter D of the pore which mercury can penetrate at the pressure are inversely proportional to each other. In view of the foregoing, a pore diameter distribution was determined by automatically replacing the axis of abscissa P of a P-V curve, which was obtained by measuring the amount V of the liquid to penetrate at the pressure P while changing the pressure, with the pore diameter based on the equation.

The measurement may be performed with a measuring apparatus, such as a fully automatic multifunctional mercury porosimeter PoreMaster series/PoreMaster-GT series manufactured by Yuasa Ionics or an automatic porosimeter Autopore IV9500 series manufactured by Shimadzu Corporation.

Specifically, the measurement was performed with Autopore IV9520 manufactured by Shimadzu Corporation under the following conditions by the following procedure.

Measurement Conditions
Measurement environment: 20° C.
Measurement Cell
  Sample volume: 5 cm$^3$
  Penetration volume: 1.1 cm$^3$
  Application: for powder
Measuring range: 2.0 psia (13.8 kPa) or more and 59,989.6 psia (413.7 MPa) or less
Measuring step: 80 steps (steps are provided so as to be arranged at an equal interval when the pore diameter is represented on a logarithmic scale)
Penetration Parameter
  Exhaust pressure: 50 μmHg
  Exhaust time: 5.0 min
  Mercury injection pressure: 2.0 psia (13.8 kPa)
  Equilibrium time: 5 secs
High-Pressure Parameter
  Equilibrium time: 5 secs
Mercury Parameter
  Advancing contact angle: 130.0 degrees
  Receding contact angle: 130.0 degrees
  Surface tension: 485.0 mN/m (485.0 dynes/cm)
  Mercury density: 13.5335 g/mL Measurement Procedure (1) About 1.0 g of the porous magnetic core is weighed and loaded into a sample cell. The weighed value is input.
(2) A mercury injection amount in the range of from 2.0 psia (13.8 kPa) or more to 45.8 psia (315.6 kPa) or less is measured in a low-pressure portion.
(3) A mercury injection amount in the range of from 45.9 psia (316.3 kPa) or more to 59,989.6 psia (413.6 MPa) or less is measured in a high-pressure portion.
(4) The pore diameter distribution is calculated from the mercury injection pressure and the mercury injection amount.

The steps (2), (3), and (4) were automatically performed with the software included with the apparatus.

The pore diameter at which a differential pore volume in the pore diameter range of from 0.1 μm or more to 3.0 μm or less becomes maximum is read from the pore diameter distribution measured as described above, and the read pore diameter is adopted as the pore diameter at which the differential pore volume becomes a local maximum.

In addition, the pore volume was calculated by integrating the differential pore volume in the pore diameter range of from 0.1 μm or more to 3.0 μm or less with the software included with the apparatus.

Methods of Measuring Weight-Average Particle Diameter (D4) and Number-Average Particle Diameter (D1)

The weight-average particle diameter (D4) and number-average particle diameter (D1) of the toner were measured with a precision particle size distribution-measuring apparatus "Coulter Counter Multisizer 3" (trademark, manufactured by Beckman Coulter, Inc.) based on a pore electrical resistance method including a 100-micrometer aperture tube, and dedicated software "Beckman Coulter Multisizer 3 Version 3.51" (manufactured by Beckman Coulter, Inc.) included therewith for setting measurement conditions and analyzing measurement data. The measurement was performed at a number of effective measurement channels of 25,000, and the measurement data was analyzed to calculate the diameters.

A product obtained by dissolving guaranteed sodium chloride in ion-exchanged water so as to have a concentration of about 1 mass %, such as "ISOTON II" (manufactured by Beckman Coulter, Inc.), may be used as an electrolyte aqueous solution to be used in the measurement.

The dedicated software was set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to "ISOTON II," and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to from 2 μm to 60 μm.

A specific measurement method is as described below.

(1) About 200 ml of the electrolyte aqueous solution is charged into a 250-milliliter round-bottom beaker made of glass dedicated for the Multisizer 3. The beaker is set in a sample stand, and the solution is stirred with a stirrer rod at 24 rotations/sec in a counterclockwise direction. Then, dirt and bubbles in the aperture tube are removed by the "aperture flush" function of the analytical software.

(2) About 30 ml of the electrolyte aqueous solution is charged into a 100-milliliter flat-bottom beaker made of glass. About 0.3 ml of a diluted liquid obtained by diluting "Contaminon N" (a 10 mass % aqueous solution of a neutral detergent for washing a precision measuring device formed of a nonionic surfactant, an anionic surfactant, and an organic builder, and having a pH of 7, manufactured by Wako Pure Chemical Industries, Ltd.) with ion-exchanged water by three mass fold is added as a dispersant to the solution.

(3) A predetermined amount of ion-exchanged water is charged into the water tank of an ultrasonic dispersing unit "Ultrasonic Dispersion System Tetra 150" (manufactured by Nikkaki Bios Co., Ltd.) having an electrical output of 120 W, the unit having incorporated thereinto two oscillators each having an oscillatory frequency of 50 kHz under a state in which the oscillators are out of phase by 180°. About 2 ml of the Contaminon N is added to the water tank.

(4) The beaker in the section (2) is set in the beaker fixing hole of the ultrasonic dispersing unit, and the ultrasonic dispersing unit is operated. Then, the height position of the beaker is adjusted so that the liquid level of the electrolyte aqueous solution in the beaker may resonate with an ultrasonic wave from the unit to the maximum extent.

(5) About 10 mg of the toner is gradually added to and dispersed in the electrolyte aqueous solution in the beaker in the section (4) under a state in which the electrolyte aqueous solution is irradiated with the ultrasonic wave. Then, the ultrasonic dispersion treatment is further continued for 60 seconds. At the time of the ultrasonic dispersion, the temperature of water in the water tank is appropriately regulated so as to be 10° C. or more and 40° C. or less.

(6) The electrolyte aqueous solution in the section (5) having dispersed therein the toner is dropped with a pipette to the round-bottom beaker in the section (1) placed in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the weight-average particle diameter (D4) and the number-average particle diameter (D1) are calculated. An "average diameter" on the "analysis/volume statistics (arithmetic average)" screen of the dedicated software when the dedicated software is set to show a graph in a vol % unit is the weight-average particle diameter (D4), and an "average diameter" on the "analysis/number statistics (arithmetic average)" screen thereof when the dedicated software is set to show a graph in a number % unit is the number-average particle diameter (D1).

Method of Calculating Amount of Fine Powder

The amount (number %) of fine powder in the toner on a number basis is calculated as described below.

In the case of, for example, the number percentage of particles each having a particle diameter of 4.0 µm or less in the toner, the particle diameters of the particles are measured with the Multisizer 3, and then (1) its dedicated software is set to show a graph in a number % unit so that the chart of the measurement results may be displayed in a number % unit. (2) A check mark is placed in the "<" of a particle diameter setting portion on the "format/particle diameter/particle diameter statistics" screen of the software, and "4" is input in a particle diameter input portion below the portion. Then, (3) the "analysis/number statistics (arithmetic average)" screen thereof is displayed. A numerical value in a "<4 µm" display portion on the screen at that time is the number percentage of the particles each having a particle diameter of 4.0 µm or less in the toner.

Method of Calculating Amount of Coarse Powder

The amount (vol %) of coarse powder in the toner on a volume basis is calculated as described below.

In the case of, for example, the volume percentage of particles each having a particle diameter of 10.0 µm or more in the toner, the particle diameters of the particles are measured with the Multisizer 3, and then (1) the dedicated software is set to show a graph in a volume % unit so that the chart of the measurement results may be displayed in a volume % unit. (2) A check mark is placed in the ">" of the particle diameter setting portion on the "format/particle diameter/particle diameter statistics" screen, and "10" is input in the particle diameter input portion below the portion. Then, (3) the "analysis/volume statistics (arithmetic average)" screen of the software is displayed. A numerical value in a ">10 µm" display portion on the screen at that time is the volume percentage of the particles each having a particle diameter of 10.0 µm or more in the toner.

Methods of Measuring Molecular Weight and Molecular Weight Distribution of Resin or the Like The molecular weight and molecular weight distribution of a resin or the like are measured by gel permeation chromatography (GPC) as described below.

First, the sample is dissolved in tetrahydrofuran (THF) at room temperature over 24 hours. Then, the resultant solution is filtered with a solvent-resistant membrane filter "MYSYORIDISK" (manufactured by Tosoh Corporation) having a pore diameter of 0.2 µm to provide a sample solution. The concentration of a THF-soluble component in the sample solution is adjusted to about 0.8 mass %. The measurement is performed with the sample solution under the following conditions.

Apparatus: HLC 8120 GPC (detector: RI) (manufactured by Tosoh Corporation)
Column: Septuplicate of Shodex KF-801, 802, 803, 804, 805, 806, and 807 (manufactured by Showa Denko K.K.)
Eluent: Tetrahydrofuran (THF)
Flow rate: 1.0 mL/min
Oven temperature: 40.0° C.
Sample injection amount: 0.10 mL In the calculation of the molecular weight of the sample, a molecular weight calibration curve prepared with standard polystyrene resins (product names: "TSK Standard Polystyrenes F-850, F-450, F-288, F-128, F-80, F-40, F-20, F-10, F-4, F-2, F-1, A-5000, A-2500, A-1000, and A-500," manufactured by Tosoh Corporation) is used.

Method of Measuring Si Atom Concentration by XPS

The magnetic carrier is bonded onto indium foil. At that time, the particles of the carrier are uniformly bonded thereonto so that the indium foil portion may not be exposed.
Measurement conditions are as described below.
Apparatus: PHI 5000 VERSAPROBE II (ULVAC-PHI, Inc.)
Applied ray: Al Kα ray
Output: 25 W, 15 kV
Pass energy: 58.7 eV
Stepsize: 0.125 eV
XPS peaks: C1s, O1s, Si2p, Ti2p, and Sr3d Structure of Resin (NMR)

The structure of a resin (e.g., a 1,2-polybutadiene resin or amorphous polyester) in the toner is analyzed by nuclear magnetic resonance spectroscopy ($^1$H-NMR).
Measuring apparatus: JNM-EX400 (manufactured by JEOL Ltd.)
Measurement frequency: 400 MHz
Pulse condition: 5.0 µs
Frequency range: 10,500 Hz
Number of scans: 1,024 times
Measurement solvent: DMSO-d6

The sample is dissolved in DMSO-d6 to the extent possible, and measurement is performed under the above-mentioned conditions. The structure and the like of the sample are determined from the chemical shift value and proton ratio of a spectrum to be obtained.

Method of Calculating SP Value

An SP value is referred to as "solubility parameter," and is obtained by converting the ease with which compounds are soluble with each other in terms of their chemical structures into a numerical value. A case in which the compounds have SP values closer to each other means that the compounds are more mixable and compatible with each other. Although various methods are each available as a method of calculating such SP value, Fedors' method that has been generally used is used in the present disclosure. The method is described in detail in, specifically, for example, Polymer Engineering and Science, vol. 14, pp. 147 to 154, and the SP value may be calculated from the following equation.

$$\text{SP value} = \sqrt{(Ev/v)} = \sqrt{(\Sigma \Delta ei/\Sigma \Delta vi)} \quad \text{Equation:}$$

In the equation, Ev represents the evaporation energy (cal/mol) of a compound, "v" represents the molar volume (cm$^3$/mol) thereof, $\Delta ei$ represents the evaporation energy of each atom or atomic group, and $\Delta vi$ represents the molar volume of each atom or atomic group.

Method of Producing Toner

Although a method of producing the toner particle is not particularly limited, a pulverization method is preferred from the viewpoint of the dispersion of a release agent and a polymer obtained by the graft polymerization of a styrene acrylic polymer to a polyolefin. This is because of the following reason. When the toner particle is produced in an aqueous medium, the release agent having high hydrophobicity and the polymer obtained by the graft polymerization of the styrene acrylic polymer to the polyolefin tend to localize in the toner particle. Accordingly, a desired core-shell structure is hardly formed.

Now, a production process for the toner based on the pulverization method is described.

In a raw material-mixing step, predetermined amounts of materials for forming the toner particles, for example, the binder resin, the release agent, the colorant, the crystalline polyester, and as required, other components, such as the charge control agent, are weighed, and the materials are blended and mixed. As a mixing apparatus, there are given, for example, a double cone mixer, a V-type mixer, a drum-type mixer, a super mixer, a Henschel mixer, a Nauta mixer, and MECHANO HYBRID (manufactured by Nippon Coke & Engineering Co., Ltd.).

Next, the mixed materials are melted and kneaded so that the wax and the like may be dispersed in the binder resin. In the melting and kneading step, a batch-type kneading machine, such as a pressure kneader or a Banbury mixer, or a continuous kneading machine may be used, and a single or twin screw extruder is mainly used because of having an advantage in that continuous production can be performed. Examples thereof include a KTK-type twin screw extruder (manufactured by Kobe Steel, Ltd.), a TEM-type twin screw extruder (manufactured by Toshiba Machine Co., Ltd.), a PCM kneader (manufactured by Ikegai Corp.), a twin screw extruder (manufactured by KCK), a co-kneader (manufactured by BUSS), and Kneadex (manufactured by Nippon Coke & Engineering Co., Ltd.). Further, a resin composition to be obtained by the melting and kneading is rolled with a two-roll mill or the like, and may be cooled with water or the like in a cooling step.

Next, the cooled product of the resin composition is pulverized to a desired particle diameter in a pulverizing step. In the pulverizing step, the cooled product is coarsely pulverized with a pulverizer, such as a crusher, a hammer mill, or a feather mill, and is then finely pulverized with, for example, Kryptron System (manufactured by Kawasaki Heavy Industries, Ltd.), Super Rotor (manufactured by Nisshin Engineering Inc.), Turbo Mill (manufactured by Turbo Kogyo Co., Ltd.), or a fine pulverizer based on an air-jet system.

After that, as required, the finely pulverized product is classified with a classifier or a sieving machine, such as Elbow-Jet (manufactured by Nittetsu Mining Co., Ltd.) of an inertial classification system, or Turboplex (manufactured by Hosokawa Micron Corporation), TSP Separator (manufactured by Hosokawa Micron Corporation), or Faculty (manufactured by Hosokawa Micron Corporation) of a centrifugal force classification system.

After that, the surface treatment of the toner particles by heating is performed to increase the circularity of the toner. The surface treatment may be performed with hot air through use of, for example, a surface treatment apparatus illustrated in FIG. 1.

A mixture supplied in a constant amount by a raw material constant amount supply unit 1 is introduced into an introduction tube 3 arranged on the vertical line of a raw material supply unit by a compressed gas adjusted by a compressed gas-adjusting unit 2. The mixture that has passed through the introduction tube is uniformly dispersed by a protruding member 4 of a conical shape arranged in the central portion of the raw material supply unit, is introduced into supply tubes 5 radially spreading in 8 directions, and is introduced into a treatment chamber 6 where heat treatment is performed.

At this time, the flow of the mixture supplied to the treatment chamber is regulated by a regulating unit 9 for regulating the flow of the mixture, the unit being arranged in the treatment chamber. Accordingly, the mixture supplied to the treatment chamber is heat-treated while swirling in the treatment chamber, and is then cooled.

The hot air for heat-treating the supplied mixture is supplied from a hot air supply unit 7, and the hot air is introduced into the treatment chamber while being caused to swirl spirally by swirling members 13 and 12 for causing the hot air to swirl. With regard to the configuration of such member, the swirling member 13 for causing the hot air to swirl has a plurality of blades, and can control the swirling of the hot air in accordance with the number and angles of the blades. The temperature of the hot air supplied into the treatment chamber in the outlet portion 11 of the hot air supply unit 7 is preferably from 100° C. to 300° C. When the temperature in the outlet portion 11 of the hot air supply unit falls within the range, the toner particles can be uniformly subjected to sphering treatment while the melt adhesion and coalescence of the toner particles due to excessive heating of the mixture are prevented.

Further, the heat-treated toner particles that have been heat-treated are cooled by cold air supplied from cold air supply units 8. The temperature of the cold air supplied from the cold air supply units (8-1, 8-2, and 8-3) is preferably from −20° C. to 30° C. When the temperature of the cold air falls within the range, the heat-treated toner particles can be efficiently cooled, and hence the melt adhesion and coalescence of the heat-treated toner particles can be prevented without inhibition of uniform sphering treatment of the mixture. The absolute moisture content of the cold air is preferably 0.5 g/m$^3$ or more and 15.0 g/m$^3$ or less.

Next, the heat-treated toner particles that have been cooled are recovered by a recovering unit 10 present at the lower end of the treatment chamber. The recovering unit has a configuration in which a blower (not shown) is arranged at its tip, and the particles are sucked and conveyed by the blower.

In addition, a powder particle supply port 14 is arranged so that the swirling direction of the supplied mixture and the swirling direction of the hot air may be the same direction, and the recovering unit 10 of the surface treatment apparatus is arranged in the outer peripheral portion of the treatment chamber so as to maintain the swirling direction of powder particles that have been caused to swirl. Further, the cold air supplied from the cold air supply units 8 is configured to be supplied from the outer peripheral portion of the apparatus to the inner peripheral surface of the treatment chamber from horizontal and tangential directions. All of the swirling direction of the mixture supplied from the powder particle supply port, the swirling direction of the cold air supplied from the cold air supply units, and the swirling direction of the hot air supplied from the hot air supply unit are the same direction. Accordingly, no turbulent flow occurs in the treatment chamber, and hence a swirling flow in the apparatus is strengthened. Thus, a strong centrifugal force is applied to the heat-treated toner particles to further improve the dispersibility of the heat-treated toner particles. Accordingly, toner particles having a small number of coalesced particles and having a uniform shape can be obtained.

The average circularity of the toner particles is preferably 0.960 or more and 0.980 or less from the viewpoint of fogging resistance because the non-electrostatic adhesive force thereof can be suppressed to a low level.

After that, the heat-treated toner particles are classified into the following two sides: a fine powder side and a coarse powder side. The toner particles are classified into the two sides with, for example, Elbow-Jet (manufactured by Nittetsu Mining Co., Ltd.) of an inertial classification system. The toner is obtained by subjecting the respective surfaces of the heat-treated toner particles that have been classified into the two sides to external addition treatment with a desired amount of silica fine particles A. An example of a method for the external addition treatment is a method including stirring and mixing the toner particles and the fine particles through use of a mixing apparatus, such as a double cone mixer, a V-type mixer, a drum-type mixer, a super mixer, a Henschel mixer, a Nauta mixer, MECHANO HYBRID (manufactured by Nippon Coke & Engineering Co., Ltd.), or NOBILTA (manufactured by Hosokawa Micron Corporation), as an external addition machine. At that time, the toner particles may be subjected to external addition treatment with an external additive except the silica fine particles, such as a plasticizer, as required.

EXAMPLES

Now, the present disclosure is more specifically described with reference to Examples. However, the present disclosure is by no means limited to these Examples. The term "part(s)" as used in Examples means "part(s) by mass" unless otherwise stated.

Production Example of Magnetic Core 1

Magnetite fine particles (spherical, number-average particle diameter: 250 nm, saturation magnetization: 50 (Am²/kg), residual magnetization: 4.2 (Am²/kg), coercive force: 4.4 (kA/m), specific resistance in 1,000 (V/cm): 3.3×10⁶ ($\Omega \cdot cm$)) and a silane-based coupling agent (3-(2-aminoethylaminopropyl)trimethoxysilane) (in an amount of 3.0 mass % with respect to the mass of the magnetite fine particles) were introduced into a container. Then, the materials were mixed and stirred at high speed in the container at a temperature of 100° C. or more so that the surfaces of the magnetite fine particles were treated.

| | |
|---|---|
| Phenol | 10.0 parts by mass |
| Formaldehyde solution (37 mass % aqueous solution of formaldehyde) | 16.0 parts by mass |
| The above-mentioned surface-treated magnetite fine particles | 84.0 parts by mass |

The above-mentioned materials were introduced into a reaction tank and sufficiently mixed at a temperature of 40° C.

After that, the mixture was heated to a temperature of 85° C. at an average rate of temperature increase of 3 (° C./min) while being stirred, followed by the addition of 4 parts by mass of 28 mass % ammonia water and 25 parts by mass of water to the reaction tank. The mixture was held at a temperature of 85° C., and was subjected to a polymerization reaction for 3 hours to be cured. The peripheral speed of a stirring blade at this time was set to 1.8 (m/sec).

After the polymerization reaction, the resultant was cooled to a temperature of 30° C., and water was added thereto. The supernatant was removed, and the resultant precipitate was washed with water and air-dried. The resultant air-dried product was dried under reduced pressure (5 hPa or less) at a temperature of 60° C. to provide magnetic material-dispersed resin core particles. The particles are adopted as a magnetic core 1. The configuration of the resultant magnetic core 1 is summarized in Table 1.

Production Example of Porous Magnetic Particles

Step 1 (Weighing/Mixing Step)

$Fe_2O_3$: 61.7 mass %
$MnCO_3$: 34.2 mass %
$Mg(OH)_2$: 3.0 mass %
$SrCO_3$: 1.1 mass %

Ferrite raw materials were weighed as described above.

After that, the raw materials were pulverized and mixed with a dry ball mill using zirconia balls (φ10 mm) for 2 hours.

Step 2 (Pre-Calcining Step)

After the pulverization and the mixing, the mixture was calcined in the air with a burner-type calcining furnace at 950° C. for 2 hours to produce a pre-calcined ferrite. The composition of the ferrite is as described below.

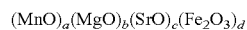

$(MnO)_a(MgO)_b(SrO)_c(Fe_2O_3)_d$

In the formula, a=0.40, b=0.07, c=0.01, and d=0.52.

Step 3 (Pulverizing Step)

The pre-calcined ferrite was pulverized to about 0.5 mm with a crusher, and then 30 parts by mass of water was added to 100 parts by mass of the pre-calcined ferrite, followed by the pulverization of the mixture with a wet ball mill using zirconia balls (φ1.0 mm) for 2 hours. After the balls had been separated, the pulverized product was pulverized with a wet bead mill using zirconia beads (0.0 mm) for 3 hours to provide a ferrite slurry.

Step 4 (Granulating Step)

2.0 Parts by mass of polyvinyl alcohol with respect to 100 parts by mass of the pre-calcined ferrite was added as a binder to the ferrite slurry, and the mixture was granulated with a spray dryer (manufacturer: Ohkawara Kakohki Co., Ltd.) into spherical particles of 40 μm.

Step 5 (Calcining Step)

To control a calcining atmosphere, the spherical particles were calcined in an electric furnace under a nitrogen atmosphere (oxygen concentration: 1.0 vol %) at 1,150° C. for 4 hours.

Step 6 (Sorting Step)

After an agglomerated particle had been shredded, coarse particles were removed by sieving with a sieve having an aperture of 250 μm. Thus, porous magnetic particles were obtained.

Production Example of Magnetic Core 2

Step 7 (Resin Filling Step)

| | |
|---|---|
| The above-mentioned porous magnetic particles | 71.7 parts by mass |
| Benzoguanamine-n-butyl alcohol-formaldehyde co-condensate | 15.0 parts by mass |
| Acrylic resin (manufactured by Mitsui Chemicals, Inc., ALMATEX 748-5M, solid content: 55%) | 13.3 parts by mass |

The above-mentioned materials were loaded into the stirring container of a mixing stirrer (universal stirrer model NDMV manufactured by Dalton Co., Ltd.), and were stirred under a nitrogen atmosphere for 2 hours while a temperature in the container was kept at 60° C. and a pressure therein was reduced to 2.3 kPa. After that, the temperature was increased to 100° C., and the solvent was removed under reduced pressure, followed by the filling of the materials into the porous magnetic particles. After having been cooled, the resultant resin-filled particles were moved to a mixer having a spiral blade in a rotatable mixing container (Drum Mixer Model UD-AT manufactured by Sugiyama Heavy Industrial Co., Ltd.), and their temperature was increased to 220° C. under a nitrogen atmosphere and normal pressure at a rate of temperature increase of 2 (° C./min). The particles were heated and stirred at the temperature for 60 minutes so that the resin was cured. After the heat treatment, a low-magnetic force product was separated by magnetic separation, and the residue was classified with a sieve having an aperture of 150 μm to provide a magnetic core 2. The configuration of the resultant magnetic core 2 is shown in Table 1.

Production Example of Magnetic Core 3

Step 7 (Resin Filling Step)

100.0 Parts by mass of the above-mentioned porous magnetic particles were loaded into the stirring container of a mixing stirrer (universal stirrer model NDMV manufactured by Dalton Co., Ltd.). Then, while the temperature in the container was kept at 60° C., the pressure in the container was reduced to 2.3 kPa. During the decompression, nitrogen was introduced into the container, and a silicone resin solution (SR 2410 manufactured by Dow Corning Toray Co., Ltd.) was dropped under reduced pressure so that its amount in terms of a resin component was 7.5 parts by mass with respect to the porous magnetic particles. After the completion of the dropping, the mixture was continuously stirred for 2 hours without being subjected to any other treatment. After that, the temperature was increased to 70° C., and the solvent was removed under reduced pressure. Thus, a silicone resin composition obtained from the silicone resin solution was filled into the particles of the porous magnetic particles. After having been cooled, the resultant filled core particles were moved to a mixer having a spiral blade in a rotatable mixing container (drum mixer model UD-AT manufactured by Sugiyama Heavy Industrial Co., Ltd.), and their temperature was increased to 220° C. under a nitrogen atmosphere and normal pressure at a rate of temperature increase of 2 (° C./min). The resin was cured by heating and stirring the particles at the temperature for 60 minutes. After the heat treatment, a low-magnetic force product was separated by magnetic separation, and the remainder was classified with a sieve having an aperture of 150 μm. Thus, a magnetic core 3 was obtained. The configuration of the resultant magnetic core 3 is shown in Table 1.

Production Example of Magnetic Core 4

Step 1 (Weighing/Mixing Step)

$Fe_2O_3$: 61.7 mass %
$MnCO_3$: 34.2 mass %
$Mg(OH)_2$: 3.0 mass %
$SrCO_3$: 1.1 mass %
Ferrite raw materials were weighed as described above.

After that, the raw materials were pulverized and mixed with a dry ball mill using zirconia balls (φ10 mm) for 2 hours.

Step 2 (Pre-Calcining Step)

After the pulverization and the mixing, the mixture was calcined in the air with a burner-type calcining furnace at 1,000° C. for 2 hours to produce a pre-calcined ferrite. The composition of the ferrite is as described below.

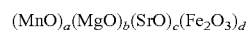

$(MnO)_a(MgO)_b(SrO)_c(Fe_2O_3)_d$

In the formula, a=0.40, b=0.07, c=0.01, and d=0.52.

Step 3 (Pulverizing Step)

The pre-calcined ferrite was pulverized to about 0.5 mm with a crusher, and then 30 parts by mass of water was added to 100 parts by mass of the pre-calcined ferrite, followed by the pulverization of the mixture with a wet ball mill using stainless-steel balls (φ1.0 mm) for 2 hours. After the balls had been separated, the pulverized product was pulverized with a wet bead mill using stainless-steel balls (0.0 mm) for 3 hours to provide a ferrite slurry.

Step 4 (Granulating Step)

2.0 Parts by mass of polyvinyl alcohol with respect to 100 parts by mass of the pre-calcined ferrite was added as a binder to the ferrite slurry, and the mixture was granulated with a spray dryer (manufacturer: Ohkawara Kakohki Co., Ltd.) into spherical particles of 45 μm.

Step 5 (Calcining Step)

To control a calcining atmosphere, the spherical particles were calcined in an electric furnace under a nitrogen atmosphere (oxygen concentration: 0.6 vol %) at 1,200° C. for 6 hours.

Step 6 (Sorting Step)

After an agglomerated particle had been shredded, coarse particles were removed by sieving with a sieve having an aperture of 250 μm. Thus, ferrite core particles were obtained. The particles are adopted as a magnetic core 4. The configuration of the resultant magnetic core 4 is shown in Table 1.

TABLE 1

| Magnetic core | Kind | Binder resin | Filling resin | 50% particle diameter D50 (μm) on a volume distribution basis | Apparent density (g/cm$^3$) | True density (g/cm$^3$) |
|---|---|---|---|---|---|---|
| 1 | Magnetic material-dispersed resin core | Phenol resin | — | 35 | 1.91 | 3.54 |
| 2 | Porous magnetic core | — | Thermosetting acrylic resin | 40 | 1.86 | 3.96 |
| 3 | Porous magnetic core | — | Silicone resin | 40 | 1.86 | 3.97 |
| 4 | Ferrite core | — | — | 46 | 2.36 | 4.87 |

Method of Producing Graft Resin A1

95.2 Mass percent of a silicone-containing acrylic monomer corresponding to the unit Y1 described below and 4.8 mass % of a monomer corresponding to the unit Y2 were added to a four-necked flask including a reflux condenser, a temperature gauge, a nitrogen suction tube, and a grinding-type stirring apparatus. The structures of the unit Y1 and the unit Y2 are shown in Table 2.

Further, 100 parts by mass of toluene, 100 parts by mass of methyl ethyl ketone, and 2.0 parts by mass of azobisisovaleronitrile were added to the flask. The resultant mixture was held in a stream of nitrogen at 70° C. for 10 hours to be subjected to a polymerization reaction. After the completion of the reaction, the resultant was repeatedly washed to provide a solution of a resin A1 (solid content: 35 mass %). The value of the s(l+m) of the solution calculated by gel permeation chromatography (GPC) was 70.

Production Examples of Graft Resins A2 to A25

Graft resins A2 to A25 were each obtained in the same manner as in the method of producing the graft resin A1 except that the structures of the unit Y1 and the unit Y2, and the values of the "Ma", the "Mb", the "n", and the s(l+m) were changed as shown in Table 2.

TABLE 2

| Graft resin A | Unit Y1 | | | | Unit Y2 | | |
|---|---|---|---|---|---|---|---|
| | R1 | R2 | Molar ratio | a (g) | R3 | R4 | R5 |
| A1 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A2 | Methyl group | 2-Hydroxyethyl group | 7.0 | 95.2 | Methyl group | Hydrogen | — |
| | Methyl group | 2-Carboxyethyl group | 0.0 | | | | |

TABLE 2-continued

| | | | | | | | |
|---|---|---|---|---|---|---|---|
| | Methyl group | Butyl group | 39.5 | | | | |
| | Methyl group | Methyl group | 53.5 | | | | |
| A3 | Methyl group | 2-Hydroxyethyl group | 0.0 | 95.2 | Hydrogen | Hydrogen | Trimethylene group |
| | Methyl group | 2-Carboxyethyl group | 7.0 | | | | |
| | Methyl group | Butyl group | 39.5 | | | | |
| | Methyl group | Methyl group | 53.5 | | | | |
| A4 | Methyl group | 2-Hydroxyethyl group | 7.0 | 95.2 | Hydrogen | Methyl group | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A5 | Methyl group | 2-Hydroxyethyl group | 0.0 | 95.2 | Methyl group | Hydrogen | Trimethylene group |
| | Methyl group | 2-Carboxyethyl group | 7.0 | | | | |
| | Methyl group | Butyl group | 39.5 | | | | |
| | Methyl group | Methyl group | 53.5 | | | | |
| A6 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A7 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A8 | Methyl group | 2-Hydroxyethyl group | 3.5 | 95.2 | Methyl group | Hydrogen | Trimethylene group |
| | Methyl group | 2-Carboxyethyl group | 3.5 | | | | |
| | Methyl group | Butyl group | 39.5 | | | | |
| | Methyl group | Methyl group | 53.5 | | | | |
| A9 | Methyl group | 2-Hydroxyethyl group | 0.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 60.5 | | | | |
| A10 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A11 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A12 | Methyl group | 2-Hydroxyethyl group | 7.0 | 95.2 | Methyl group | Hydrogen | Trimethylene group |
| | Methyl group | 2-Carboxyethyl group | 0.0 | | | | |

TABLE 2-continued

| ID | | | | | | | |
|---|---|---|---|---|---|---|---|
| | Methyl group | Butyl group | 39.5 | | | | |
| | Methyl group | Methyl group | 53.5 | | | | |
| A13 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A14 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A15 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A16 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A17 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A18 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A19 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A20 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A21 | Methyl group | 2-Hydroxyethyl group | 7.0 | 50 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A22 | Methyl group | 2-Hydroxyethyl group | 7.0 | 96.6 | Methyl group | Hydrogen | Trimethylene group |
| | Methyl group | 2-Carboxyethyl group | 0.0 | | | | |

TABLE 2-continued

| | | | | | | | |
|---|---|---|---|---|---|---|---|
| | Methyl group | Butyl group | 39.5 | | | | |
| | Methyl group | Methyl group | 53.5 | | | | |
| A23 | Methyl group | 2-Hydroxyethyl group | 7.0 | 95.2 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A24 | Methyl group | 2-Hydroxyethyl group | 7.0 | 98 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |
| A25 | Methyl group | 2-Hydroxyethyl group | 7.0 | 33.3 | Methyl group | Hydrogen | Trimethylene group |
| | Methyl group | 2-Carboxyethyl group | 0.0 | | | | |
| | Methyl group | Butyl group | 39.5 | | | | |
| | Methyl group | Methyl group | 53.5 | | | | |

| Graft resin A | Unit Y2 | | | | X | $(M_a + M_b)/$ | $M_a/$ |
|---|---|---|---|---|---|---|---|
| | R6 | R7 | b (g) | n | s (g) | X | Mb |
| A1 | Methyl group | Methyl group | 4.8 | 6 | 70 | 105 | 0.95 | 19.8 |
| A2 | Methyl group | Methyl group | 4.8 | 6 | 70 | 105 | 0.95 | 19.8 |
| A3 | Methyl group | Methyl group | 4.8 | 6 | 70 | 105 | 0.95 | 19.8 |
| A4 | Methyl group | Methyl group | 4.8 | 6 | 70 | 105 | 0.95 | 19.8 |
| A5 | Propyl group | Methyl group | 4.8 | 6 | 70 | 105 | 0.95 | 19.8 |
| A6 | Ethyl group | Methyl group | 4.8 | 6 | 70 | 105 | 0.95 | 19.8 |
| A7 | Propyl group | Methyl group | 4.8 | 6 | 70 | 105 | 0.95 | 19.8 |
| A8 | Butyl group | Methyl group | 4.8 | 6 | 70 | 105 | 0.95 | 19.8 |
| A9 | Methyl group | Hydrogen group | 4.8 | 6 | 70 | 105 | 0.95 | 19.8 |
| A10 | Hexyl group | Methyl group | 4.8 | 6 | 65 | 105 | 0.95 | 19.8 |
| A11 | Cyclohexyl group | Methyl group | 4.8 | 6 | 75 | 105 | 0.95 | 19.8 |
| A12 | Methyl group | Methyl group | 4.8 | 6 | 60 | 105 | 0.95 | 19.8 |
| A13 | Methyl group | Methyl group | 4.8 | 6 | 80 | 105 | 0.95 | 19.8 |
| A14 | Methyl group | Methyl group | 4.8 | 6 | 200 | 105 | 0.95 | 19.8 |
| A15 | Methyl group | Methyl group | 4.8 | 6 | 230 | 105 | 0.95 | 19.8 |
| A16 | Methyl group | Methyl group | 4.8 | 6 | 50 | 105 | 0.95 | 19.8 |
| A17 | Methyl group | Methyl group | 4.8 | 6 | 250 | 105 | 0.95 | 19.8 |
| A18 | Methyl group | Methyl group | 4.8 | 5 | 40 | 105 | 0.95 | 19.8 |
| A19 | Methyl group | Methyl group | 4.8 | 60 | 260 | 105 | 0.95 | 19.8 |
| A20 | Methyl group | Methyl group | 4.8 | 70 | 40 | 105 | 0.95 | 19.8 |
| A21 | Methyl group | Methyl group | 50 | 2 | 40 | 111 | 0.90 | 1.0 |
| A22 | Methyl group | Methyl group | 3.4 | 150 | 40 | 100 | 1.00 | 28.4 |
| A23 | Methyl group | Methyl group | 4.8 | 1 | 70 | 105 | 0.95 | 19.8 |

TABLE 2-continued

| | | | | | | | |
|---|---|---|---|---|---|---|---|
| A24 | Methyl group | Methyl group | 2 | 1 | 70 | 105 | 0.95 | 49.0 |
| A25 | Methyl group | Methyl group | 66.7 | 180 | 70 | 105 | 0.95 | 0.5 |

Methods of Producing Graft Resin B1 and Graft Resins B2 to B18

A macromonomer (corresponding to the unit Y4) to be used in a graft resin B1 may be synthesized by, for example, the following approach.

The following raw materials were added to a four-necked flask including a reflux condenser, a temperature gauge, a nitrogen suction tube, and a grinding-type stirring apparatus.

| | |
|---|---|
| Methacryloyl chloride | 1.7 mass % |
| Polymethyl methacrylate having a hydroxy group at one terminal thereof (Mw; about 5,000) | 98.3 mass % |

Further, 100 parts by mass of THF and 1.0 part by mass of 4-tert-butylcatechol were added to 100 parts by mass of the above-mentioned monomer mixed liquid, and the mixture was heated to reflux for 5 hours in a stream of nitrogen. After the completion of the reaction, the resultant was washed with sodium hydrogen carbonate to provide a solution of the macromonomer.

The following monomers and the macromonomer were added to a four-necked flask including a reflux condenser, a temperature gauge, a nitrogen suction tube, and a grinding-type stirring apparatus.

| | |
|---|---|
| Cyclohexyl methacrylate (corresponding to the unit Y3) | 75.5 mass % |
| Methyl methacrylate (corresponding to the unit Y5) | 0.5 mass % |
| Methacrylic acid macromonomer including a methyl methacrylate polymer as a polymer (corresponding to the unit Y4) | 24.0 mass % |

Further, 100 parts by mass of toluene, 100 parts by mass of methyl ethyl ketone, and 2.0 parts by mass of azobisisovaleronitrile were added to 106 parts by mass of the above-mentioned monomer mixed liquid. The resultant mixture was held in a stream of nitrogen at 70° C. for 10 hours to be subjected to a polymerization reaction. After the completion of the reaction, the resultant was repeatedly washed to provide a solution of a resin B1 (solid content: 35 mass %). The weight-average molecular weight of the solution measured by gel permeation chromatography (GPC) was 57,000. The configuration of the resin is shown in Table 3.

Graft resins B2 to B18 were each produced by the same method as that of the graft resin B1 except that the monomers were changed so that a configuration shown in Table 3 was obtained.

TABLE 3

| | Unit Y3 | | | Unit Y4 | | |
|---|---|---|---|---|---|---|
| Graft resin B | R7 | R8 | Content (mass %) | R10 | R11 | Weight-average molecular weight Mw |
| B1 | Methyl group | Cyclohexyl group | 76.0 | Methyl group | Methyl methacrylate polymer | 5,000 |
| B2 | Methyl group | Cyclohexyl group | 76.0 | Hydrogen | Methyl acrylate polymer | 5,500 |
| B3 | Methyl group | Cyclohexyl group | 76.0 | Methyl group | Ethyl methacrylate polymer | 4,500 |
| B4 | Methyl group | Cyclohexyl group | 76.0 | Methyl group | Propyl methacrylate polymer | 6,000 |
| B5 | Methyl group | Cyclohexyl group | 76.0 | Methyl group | Butyl methacrylate polymer | 4,000 |
| B6 | Methyl group | Cyclohexyl group | 76.0 | Methyl group | Pentyl methacrylate polymer | 6,500 |
| B7 | Hydrogen | Cyclohexyl group | 76.0 | Methyl group | Hexyl methacrylate polymer | 6,500 |
| B8 | Methyl group | Cyclohexyl group | 76.0 | Methyl group | 2-Hydroxyethyl methacrylate polymer | 7,000 |
| B9 | Methyl group | Cyclohexyl group | 76.0 | Methyl group | 2-Hydroxyethyl acrylate polymer | 7,500 |
| B10 | Methyl group | Cyclohexyl group | 99.0 | Methyl group | Phenyl acrylate polymer | 2,500 |

TABLE 3-continued

| | | | | | | |
|---|---|---|---|---|---|---|
| B11 | Methyl group | Cyclohexyl group | 75.0 | Methyl group | Methyl methacrylate polymer | 9,500 |
| B12 | Methyl group | Cyclohexyl group | 69.5 | Methyl group | Methyl acrylate polymer | 2,000 |
| B13 | Methyl group | Cyclohexyl group | 69.5 | Methyl group | Methyl acrylate polymer | 3,000 |
| B14 | Methyl group | Cyclohexyl group | 69.5 | Methyl group | Methyl acrylate polymer | 10,000 |
| B15 | Methyl group | Cyclohexyl group | 69.5 | Methyl group | Methyl acrylate polymer | 1,000 |
| B16 | Methyl group | Cyclohexyl group | 69.5 | Methyl group | Methyl acrylate polymer | 11,000 |
| B17 | — | — | — | — | — | — |
| B18 | Methyl group | Cyclooctyl group | 99.5 | Methyl group | Methyl acrylate polymer | 11,000 |

| Graft resin B | Unit Y4 Content (mass %) | Unit Y5 R12 | R13 | Content (mass %) | Polysiloxane structural unit content (mass %) | Weight-average molecular weight Mw |
|---|---|---|---|---|---|---|
| B1 | 23.5 | Methyl group | Methyl group | 0.5 | 0.0 | 57,000 |
| B2 | 23.5 | Hydrogen | Methyl group | 0.5 | 0.0 | 58,000 |
| B3 | 23.5 | Methyl group | Methyl group | 0.5 | 0.0 | 56,000 |
| B4 | 23.5 | Methyl group | Methyl group | 0.5 | 0.0 | 55,000 |
| B5 | 23.5 | Methyl group | Methyl group | 0.5 | 0.0 | 59,000 |
| B6 | 23.5 | Methyl group | Methyl group | 0.5 | 0.0 | 57,000 |
| B7 | 23.5 | Methyl group | Methyl group | 0.5 | 0.0 | 58,000 |
| B8 | 23.5 | Methyl group | Methyl group | 0.5 | 0.0 | 53,000 |
| B9 | 23.5 | Methyl group | Methyl group | 0.5 | 0.0 | 61,000 |
| B10 | 0.5 | Methyl group | Ethyl group | 0.5 | 0.0 | 49,000 |
| B11 | 25.0 | — | — | — | 0.0 | 45,000 |
| B12 | 30.0 | Methyl group | Propyl group | 0.5 | 0.0 | 75,000 |
| B13 | 30.0 | Methyl group | Propyl group | 0.5 | 0.0 | 30,000 |
| B14 | 30.0 | Methyl group | Butyl group | 0.5 | 0.0 | 100,000 |
| B15 | 30.0 | Methyl group | Butyl group | 0.5 | 0.0 | 20,000 |
| B16 | 30.0 | Methyl group | Pentyl group | 0.5 | 0.1 | 120,000 |
| B17 | — | Methyl group | Methyl group | 100.0 | 0.0 | 0 |
| B18 | 0.5 | — | — | 0.0 | 0.0 | 130,000 |

Production Examples of Magnetic Carriers 1 and 2 to 27

| | |
|---|---|
| Magnetic core | 100.0 parts by mass |
| Graft resin A1 (toluene solution having a solid content of 50 mass %) | 0.2 part by mass |
| Graft resin B1 (toluene solution having a solid content of 50 mass %) | 3.8 parts by mass |

The above-mentioned materials were loaded into a planetary-screw mixer (Nauta Mixer Model VN manufactured by Hosokawa Micron Corporation), and were stirred under a reduced pressure of 1.5 kPa at 60° C.

A method for the loading was as follows: the graft resin A1 and the graft resin B1 were each loaded in an amount corresponding to one third of its total amount, and solvent removal and an application operation were performed for 20 minutes; and the foregoing step was repeated three times.

After that, the magnetic carrier coated with the coating resin composition was moved to a mixer having a spiral blade in a rotatable mixing container (drum mixer model UD-AT manufactured by Sugiyama Heavy Industrial Co., Ltd.). The magnetic carrier was heat-treated at a temperature of 120° C. under a nitrogen atmosphere for 2 hours while being stirred by rotating the mixing container 10 times per 1 minute. A low-magnetic force product was separated from the resultant magnetic carrier 1 by magnetic separation, and the remainder was passed through a sieve having an aperture of 150 µm, followed by classification with an air classifier. Thus, a magnetic carrier 1 having a 50% particle diameter (D50) on a volume basis of 39.1 µm was obtained.

The configuration of the resultant magnetic carrier 1 is shown in Table 4.

Magnetic carriers 2 to 27 were each produced by the same method as that of the magnetic carrier 1 except that the configuration was changed to that shown in Table 4.

TABLE 4

| Magnetic carrier | Surface Si amount (atomic %) | Magnetic core | SPc (J/cm³) | Coating resin Graft resin A | Ratio (wt %) | SPa (J/cm³) | SPb (J/cm³) | Graft resin B |
|---|---|---|---|---|---|---|---|---|
| 1 | 3.6 | 1 | 23.2 | 1 | 5.0 | 20.4 | 14.3 | 1 |
| 2 | 3.6 | 1 | 23.2 | 2 | 5.0 | 20.4 | 14.3 | 1 |
| 3 | 3.6 | 1 | 23.2 | 3 | 5.0 | 20.1 | 14.3 | 2 |
| 4 | 3.6 | 1 | 23.2 | 4 | 5.0 | 20.4 | 14.3 | 3 |
| 5 | 3.6 | 1 | 23.2 | 5 | 5.0 | 20.1 | 14.3 | 4 |
| 6 | 3.6 | 1 | 23.2 | 6 | 3.0 | 20.4 | 14.3 | 5 |
| 7 | 3.6 | 1 | 23.2 | 7 | 3.0 | 20.4 | 14.3 | 6 |
| 8 | 3.6 | 2 | 18.4 | 8 | 3.0 | 20.3 | 14.3 | 7 |
| 9 | 3.6 | 4 | — | 9 | 3.0 | 19.9 | 14.3 | 8 |
| 10 | 3.6 | 3 | 12.9 | 10 | 8.0 | 20.4 | 14.3 | 9 |
| 11 | 3.6 | 3 | 12.9 | 11 | 8.0 | 20.4 | 14.3 | 10 |
| 12 | 3.6 | 3 | 12.9 | 12 | 8.0 | 20.4 | 14.3 | 11 |
| 13 | 3.6 | 3 | 12.9 | 13 | 15.0 | 20.4 | 14.3 | 12 |
| 14 | 3.6 | 3 | 12.9 | 14 | 1.0 | 20.4 | 14.3 | 13 |
| 15 | 3.6 | 3 | 12.9 | 15 | 30.0 | 20.4 | 14.3 | 14 |
| 16 | 3.6 | 3 | 12.9 | 16 | 50.0 | 20.4 | 14.3 | 15 |
| 17 | 3.6 | 3 | 12.9 | 17 | 50.0 | 20.4 | 14.3 | 16 |
| 18 | 3.6 | 3 | 12.9 | 18 | 50.0 | 20.4 | 14.6 | 16 |
| 19 | 11.0 | 3 | 12.9 | 19 | 50.0 | 20.4 | 12.2 | 16 |
| 20 | 15.0 | 3 | 12.9 | 20 | 50.0 | 20.4 | 12.2 | 16 |
| 21 | 1.0 | 3 | 12.9 | 21 | 50.0 | 20.4 | 16.6 | 16 |
| 22 | 17.0 | 3 | 12.9 | 22 | 50.0 | 20.4 | 12.1 | 16 |
| 23 | 0.0 | 4 | — | — | 0.0 | — | — | 17 |
| 24 | 20.8 | 4 | — | 1 | 100.0 | — | 14.3 | — |
| 25 | 21.4 | 4 | — | 23 | 5.0 | — | 18.1 | 17 Silicone resin |
| 26 | 0.9 | 4 | — | 24 | 5.0 | — | 18.1 | 17 |
| 27 | 12.5 | 4 | — | 25 | 5.0 | — | 12.0 | 18 |

| Magnetic carrier | Coating resin Ratio (wt %) | Addition amount of coating resin (wt %) | \|SPb − SPc\| (J/cm³) | \|SPa − SPc\| (J/cm³) | Average particle diameter (μm) |
|---|---|---|---|---|---|
| 1 | 95.0 | 1.2 | 8.9 | 2.8 | 36 |
| 2 | 95.0 | 1.2 | 8.9 | 2.8 | 36 |
| 3 | 95.0 | 1.2 | 8.9 | 3.1 | 36 |
| 4 | 95.0 | 1.2 | 8.9 | 2.8 | 36 |
| 5 | 95.0 | 1.2 | 8.9 | 3.1 | 36 |
| 6 | 97.0 | 1.2 | 8.9 | 2.8 | 36 |
| 7 | 97.0 | 1.2 | 8.9 | 2.8 | 36 |
| 8 | 97.0 | 1.2 | 4.1 | 1.9 | 41 |
| 9 | 97.0 | 1.2 | — | — | 47 |
| 10 | 92.0 | 1.2 | 1.4 | 7.5 | 41 |
| 11 | 92.0 | 1.2 | 1.4 | 7.5 | 41 |
| 12 | 92.0 | 1.2 | 1.4 | 7.5 | 41 |
| 13 | 85.0 | 1.2 | 1.4 | 7.5 | 41 |
| 14 | 99.0 | 1.2 | 1.4 | 7.5 | 41 |
| 15 | 70.0 | 1.2 | 1.4 | 7.5 | 41 |
| 16 | 50.0 | 1.2 | 1.4 | 7.5 | 41 |
| 17 | 50.0 | 1.2 | 1.4 | 7.5 | 41 |
| 18 | 50.0 | 1.2 | 1.7 | 7.5 | 41 |
| 19 | 50.0 | 1.2 | 0.7 | 7.5 | 41 |
| 20 | 50.0 | 1.2 | 0.8 | 7.5 | 41 |
| 21 | 50.0 | 1.2 | 3.7 | 7.5 | 41 |
| 22 | 50.0 | 1.2 | 0.9 | 7.5 | 41 |
| 23 | 100.0 | 1.2 | — | — | 47 |
| 24 | 0.0 | 1.2 | — | — | 47 |
| 25 | 47.5 / 47.5 | 1.2 | — | — | 47 |
| 26 | 95.0 | 1.2 | — | — | 47 |
| 27 | 95.0 | 1.2 | — | — | 47 |

Production Example of Toner 1

| | |
|---|---|
| Binder resin | 100 parts by mass |
| (Polyester having a Tg of 57° C., an acid value of 12 mgKOH/g, and a hydroxyl value of 15 mgKOH/g) | |
| C.I. Pigment Blue 15:3 | 5.5 parts by mass |
| Aluminum 3,5-di-t-butylsalicylate compound | 0.2 part by mass |
| Normal paraffin wax (melting point: 90° C.) | 6.0 parts by mass |

The above-mentioned materials were mixed with a Henschel mixer (Model FM-75 manufactured by Mitsui Mining Co., Ltd.) at a number of revolutions of 1,500 rpm for a time of revolution of 5 minutes, and thereafter, the mixture was kneaded with a twin screw kneader (Model PCM-30 manufactured by Ikegai Corp.) whose temperature was set to 130° C. The kneaded product thus obtained was cooled and coarsely pulverized with a hammer mill to 1 mm or less to provide a coarsely pulverized product. The coarsely pulverized product thus obtained was finely pulverized with a mechanical pulverizer (T-250 manufactured by Turbo Kogyo Co., Ltd.). Further, the finely pulverized product was classified with Faculty (F-300 manufactured by Hosokawa Micron Corporation) to provide toner base particles 1. Operating conditions were as follows: the number of revolutions of a classification rotor was set to 11,000 rpm and the number of revolutions of a dispersion rotor was set to 7,200 rpm.

| | |
|---|---|
| Toner base particles 1 | 100.0 parts by mass |
| Silica fine particles surface-treated with 4 wt % of hexamethyldisilazane (BET specific surface area: 24 m$^2$/g) | 2.0 parts by mass |

The raw materials represented by the above-mentioned formulations were mixed with a Henschel mixer (Model FM-10C manufactured by Mitsui Mining Co., Ltd.) at a number of revolutions of 1,900 rpm for a time of revolution of 3 minutes. After that, the mixture was heat-treated with the surface treatment apparatus illustrated in FIG. 1 to provide heat-treated toner particles 1. Operating conditions were set as follows: a feeding amount was 5 kg/hr, a hot air temperature C was 160° C., a hot air flow rate was 6 m$^3$/min, a cold air temperature E was −5° C., a cold air flow rate was 4 m$^3$/min, a blower airflow rate was 20 m$^3$/min, and an injection air flow rate was 1 m$^3$/min.

The resultant particles were classified with a rotary classifier (product name: TTSP100, manufactured by Hosokawa Micron Corporation) so that fine powder and coarse powder were removed. Thus, cyan toner particles 1 having a weight-average particle diameter of 6.0 μm, an abundance ratio of particles each having a particle diameter of 4.0 μm or less of 27.8 number %, and an abundance ratio of particles each having a particle diameter of 10.0 μm or more of 2.2 vol % were obtained.

| | |
|---|---|
| Cyan toner particles 1 | 100.0 parts by mass |
| Silica fine particles surface-treated with 10 wt % of polydimethylsiloxane (BET specific surface area: 100 m$^2$/g) | 0.6 part by mass |

The above-mentioned materials were mixed with a Henschel mixer (Model FM-75 manufactured by Mitsui Miike Chemical Engineering Machinery, Co., Ltd.) at a number of revolutions of 1,900 rpm for a time of revolution of 3 minutes to provide a toner 1.

Example 1

9 Parts by mass of the toner 1 was added to 91 parts by mass of the magnetic carrier 1, and the mixture was shaken with a shaker (Model YS-8D: manufactured by Yayoi) to prepare 300 g of a two-component developer. The shaking with the shaker was performed under the conditions of 150 rpm and 2 minutes.

Meanwhile, 90 parts by mass of the toner 1 was added to 10 parts by mass of the magnetic carrier 1, and the materials were mixed for 5 minutes with a V-type mixer in a normal-temperature and normal-humidity environment of 23° C./50% RH to provide a developer for replenishment.

The following evaluations were performed by using the two-component developer and the developer for replenishment. A reconstructed machine of a color copying machine "imageRUNNER ADVANCE C5560" manufactured by Canon Inc. was used as an image-forming apparatus.

The two-component developer was loaded into the developing unit for each color of the machine, and a container for a developer for replenishment containing the developer for replenishment of each color was set in the unit. An image was formed with the machine, and various evaluations before and after an endurance test were performed.

As the endurance test, a chart for outputting an FFH image having an image ratio of 40% was used under a printing environment having a temperature of 30° C. and a humidity of 80% RH. The symbol "FFH" refers to one of the values obtained by representing 256 levels of gray in hexadecimal notation. 00 h corresponds to the first level of gray (white portion) of the 256 levels of gray, and the FFH corresponds to the 256th level of gray (solid portion) of the 256 levels of gray.

The number of images to be output was changed in accordance with each evaluation item.

Conditions

Paper: Laser beam printer paper CS-814 (81.4 g/m$^2$) (sold by Canon Marketing Japan Inc.) was used.

Image-forming speed: The machine was reconstructed so as to be capable of outputting a full-color image on 80 sheets of A4 size paper per minute.

Development conditions: The machine was reconstructed so that its development contrast was able to be adjusted to an arbitrary value and automatic correction by its main body was not activated. The machine was reconstructed so that the frequency of an AC electric field was 2.0 kHz, and the peak-to-peak voltage (Vpp) thereof was able to be changed from 0.7 kV to 1.8 kV in increments of 0.1 kV. The machine was reconstructed so as to be capable of outputting an image with each color alone.

The machine was reconstructed so as to be capable of performing development only with a cyan developing unit with the color alone.

Respective evaluation items are described below.

(1) Image Density

After image output evaluations (A4 horizontal, print percentage: 40%, 50,000 sheets) had been performed under the high-temperature and high-humidity environment (30° C., 80% RH) at the initial stage of the endurance and after the endurance, a solid image (FFH) was output. Density measurement was performed with a densitometer X-Rite 404A (manufactured by X-Rite Inc.), and the average of 6 measured values was adopted as an image density. A difference between the image densities of the image at the initial stage of the endurance and the image output after the endurance was judged by the following criteria. When the result of the evaluation was any one of A to C, it was judged that the effect of the present disclosure was obtained.

A: The density difference is less than 0.10.
B: The density difference is 0.10 or more and less than 0.15.
C: The density difference is 0.15 or more and less than 0.20.
D: The density difference is 0.20 or more and less than 0.25.
E: The density difference is 0.25 or more.

(2) Fogging

After image output evaluations (A4 horizontal, print percentage: 40%, 50,000 sheets) had been performed under the high-temperature and high-humidity environment (30° C., 80% RH) at the initial stage of the endurance and after the endurance, a solid white image was output on the entire surface of A4 paper. With regard to fogging, the whiteness of a white portion was measured with a reflectometer (manufactured by Tokyo Denshoku Co., Ltd.), and a fogging density (%) was calculated from a difference between the whiteness before the transfer and that after the transfer, and was evaluated by the following criteria. When the result of the evaluation was any one of A to C, it was judged that the effect of the present disclosure was obtained.

A: Less than 1.0%
B: 1.0% or more and less than 1.5%
C: 1.5% or more and less than 2.0%
D: 2.0% or more and less than 2.5%
E: 2.5% or more (3) Halftone Developability After image output evaluations (A4 horizontal, print percentage: 40%, 50,000 sheets) had been performed under the high-temperature and high-humidity environment (30° C., 80% RH) at the initial stage of the endurance and after the endurance, a halftone image (30H) was printed on one sheet of A4 paper. The areas of 1,000 dots were measured with a digital microscope VHX-500 (lens: wide-range zoom lens VH-Z100, manufactured by Keyence Corporation). The number average (S) of the dot areas and the standard deviation (σ) of the dot areas were calculated, and a dot reproducibility index was calculated from the following equation. Then, the roughness of the halftone image was evaluated based on the dot reproducibility index (I).

Dot reproducibility index $(I)=\sigma/S \times 100$

With regard to criteria for the evaluation of the roughness, the evaluation was performed by the following criteria. When the result of the evaluation was any one of A to C, it was judged that the effect of the present disclosure was obtained.

A: The I was less than 4.0.
B: The I was 4.0 or more and less than 5.0.
C: The I was 5.0 or more and less than 6.0.
D: The I was 7.0 or more and less than 8.0.
E: The I was 8.0 or more.

(4) Toner Scattering

After image output evaluations (A4 horizontal, print percentage: 40%, 50,000 sheets) had been performed under the high-temperature and high-humidity environment (30° C., 80% RH) at the initial stage of the endurance and after the endurance, the developing unit was removed from the inside of the main body, and the scattering states of the toner inside and outside the developing unit and the main body were visually observed and evaluated by the following criteria. When the result of the evaluation was any one of A to D, it was judged that the effect of the present disclosure was obtained.

A: No toner scattering occurs.
B: Extremely slight toner scattering occurs.
C: Slight toner scattering occurs.
D: Toner scattering faintly occurs.
E: Remarkable toner scattering occurs.

The results of the evaluations of Example 1 are shown in Table 5.

Examples 2 to 22 and Comparative Examples 1 to 5

Evaluations were performed in the same manner as in Example 1 except that the magnetic carriers 2 to 27 were used in the same manner as in Example 1. The results of the evaluations are shown in Table 5.

TABLE 5

|  | Magnetic carrier | Toner | Evaluation (1) | | Evaluation (2) | | Evaluation (3) | | Evaluation (4) |
|---|---|---|---|---|---|---|---|---|---|
|  |  |  | Density difference | Evaluation | Fogging density | Evaluation | Roughness | Evaluation | Evaluation |
| Example 1 | 1 | 1 | 0.02 | A | 0.3 | A | 2.8 | A | A |
| Example 2 | 2 | 1 | 0.04 | A | 0.5 | A | 2.5 | A | A |
| Example 3 | 3 | 1 | 0.03 | A | 0.6 | A | 3.1 | A | A |
| Example 4 | 4 | 1 | 0.06 | A | 0.6 | A | 3.0 | A | A |
| Example 5 | 5 | 1 | 0.04 | A | 0.8 | A | 3.5 | A | A |
| Example 6 | 6 | 1 | 0.07 | A | 0.8 | A | 3.1 | A | A |
| Example 7 | 7 | 1 | 0.06 | A | 1.0 | B | 2.8 | A | A |
| Example 8 | 8 | 1 | 0.05 | A | 1.1 | B | 3.5 | A | A |
| Example 9 | 9 | 1 | 0.08 | A | 1.4 | B | 3.7 | A | A |
| Example 10 | 10 | 1 | 0.09 | A | 1.3 | B | 4.2 | B | A |
| Example 11 | 11 | 1 | 0.07 | A | 1.1 | B | 4.8 | B | A |
| Example 12 | 12 | 1 | 0.09 | A | 1.3 | B | 4.5 | B | B |

TABLE 5-continued

| | Magnetic carrier | Toner | Evaluation (1) Density difference | Evaluation | Evaluation (2) Fogging density | Evaluation | Evaluation (3) Roughness | Evaluation | Evaluation (4) Evaluation |
|---|---|---|---|---|---|---|---|---|---|
| Example 13 | 13 | 1 | 0.13 | B | 1.4 | B | 4.5 | B | B |
| Example 14 | 14 | 1 | 0.11 | B | 1.6 | C | 4.6 | B | B |
| Example 15 | 15 | 1 | 0.12 | B | 1.8 | C | 4.5 | B | B |
| Example 16 | 16 | 1 | 0.11 | B | 1.6 | C | 5.2 | C | B |
| Example 17 | 17 | 1 | 0.14 | B | 1.6 | C | 5.4 | C | B |
| Example 18 | 18 | 1 | 0.14 | B | 1.5 | C | 5.3 | C | C |
| Example 19 | 19 | 1 | 0.13 | B | 1.8 | C | 5.6 | C | C |
| Example 20 | 20 | 1 | 0.18 | C | 1.7 | C | 5.6 | C | C |
| Example 21 | 21 | 1 | 0.16 | C | 1.8 | C | 5.5 | C | D |
| Example 22 | 22 | 1 | 0.18 | C | 1.8 | C | 5.5 | C | D |
| Comparative Example 1 | 23 | 1 | 0.18 | C | 3.2 | E | 5.6 | C | E |
| Comparative Example 2 | 24 | 1 | 0.17 | C | 1.9 | C | 8.1 | E | E |
| Comparative Example 3 | 25 | 1 | 0.32 | E | 1.7 | C | 5.1 | C | E |
| Comparative Example 4 | 26 | 1 | 0.16 | C | 4.6 | E | 8.3 | E | E |
| Comparative Example 5 | 27 | 1 | 0.31 | E | 3.8 | E | 5.8 | C | E |

According to the present disclosure, there can be provided the magnetic carrier that achieves a reduction in fogging, a reduction in toner scattering, a stable image density, and developability even when used for a long time period.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-012511, filed Jan. 28, 2021, and Japanese Patent Applications No. 2021-213013, filed Dec. 27, 2021 which are hereby incorporated by reference herein in their entirety.

What is claimed is:

1. A magnetic carrier comprising:
a magnetic core; and
a coating resin configured to coat a surface of the magnetic core,
wherein the coating resin contains a graft resin A and a graft resin B,
wherein the coating resin
(i) contains 1.0 mass % or more and 50.0 mass % or less of the graft resin A, and
(ii) contains 50.0 mass % or more and 99.0 mass % or less of the graft resin B,
wherein the graft resin A has a unit Y1 represented by formula (1) and a unit Y2 represented by formula (2),
wherein when a mass of the graft resin A is represented by X, a mass of the unit Y1 in the graft resin A is represented by Ma, and a mass of the unit Y2 in the graft resin A is represented by Mb, Ma, Mb, and X satisfy $0.90 \leq (Ma+Mb)/X \leq 1.00$ and $1.00 \leq Ma/Mb \leq 30.0$, and
wherein the graft resin B
(i) is a comb-shaped polymer having, as a branch, at least one moiety selected from the group consisting of: a styrene-based polymer moiety; a (meth)acrylate-based polymer moiety; and a styrene-acrylate-based polymer moiety, and
(ii) is free of a polysiloxane structure moiety or contains the polysiloxane structure moiety at a content of 0.1 mass % or less:

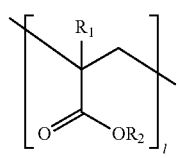

(1)

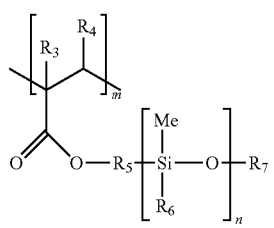

(2)

in formula (1) or formula (2),
$R_1$ represents H or $CH_3$,
$R_2$ represents a hydrocarbon group having 1 or more and 6 or less carbon atoms that may have a substituent, and the substituent is a hydroxy group or a carboxy group,
$R_3$ represents H or $CH_3$,
$R_4$ represents H or $CH_3$,
$R_5$ represents a single bond, or a hydrocarbon group having 1 or more and 6 or less carbon atoms,
$R_6$ represents a hydrocarbon group having 1 or more and 10 or less carbon atoms,
$R_7$ represents H, $CH_3$, or $Si(CH_3)_3$, and
l and m each represent an integer of 1 or more, and n represents an integer of 2 or more and 150 or less.

2. The magnetic carrier according to claim 1, wherein when an atomic percentage of Si of the magnetic carrier at a time of measurement by X-ray photoelectron spectroscopy (XPS) is represented by $Si_0$, satisfies:

$$1.0 \leq Si_0 \leq 15.0.$$

3. The magnetic carrier according to claim 1, wherein n in formula (2) represents 5 or more and 60 or less.

4. The magnetic carrier according to claim 1, wherein when a total number of the unit Y1 and the unit Y2 is represented by s, the graft resin A satisfies:

$$50 \leq s \leq 250.$$

5. The magnetic carrier according to claim 1, wherein in the coating resin, a content of the graft resin A is 1.0 mass % or more and 30.0 mass % or less, and a content of the graft resin B is 70.0 mass % or more and 99.0 mass % or less.

6. The magnetic carrier according to claim 1, wherein the graft resin B includes 75.0 mass % or more of a unit Y3 represented by formula (3):

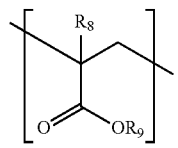

(3)

in formula (3), $R_8$ represents $CH_3$, and $R_9$ represents a cyclohexyl group, a cycloheptyl group, a cyclooctyl group, a cyclopentyl group, a cyclobutyl group, or a cyclopropyl group.

7. The magnetic carrier according to claim 1, wherein the graft resin B includes 1.0 mass % or more and 25.0 mass % or less of a unit Y4 represented by formula (4):

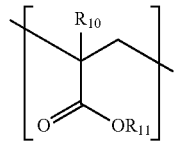

(4)

in formula (4), $R_{10}$ represents H or $CH_3$, and $R_{11}$ represents a polymer moiety.

8. The magnetic carrier according to claim 7, wherein the graft resin B further includes a unit Y5 represented by formula (5):

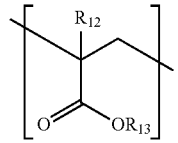

(5)

in formula (5), $R_{12}$ represents H or $CH_3$, and $R_{13}$ represents a hydrocarbon group having 1 or more and 6 or less carbon atoms.

9. A two-component developer comprising:
a magnetic carrier; and
a toner,
wherein the magnetic carrier includes a magnetic core and a coating resin configured to coat a surface of the magnetic core,
wherein the coating resin contains a graft resin A and a graft resin B, wherein the coating resin
(i) contains 1.0 mass % or more and 50.0 mass % or less of the graft resin A, and
(ii) contains 50.0 mass % or more and 99.0 mass % or less of the graft resin B,
wherein the graft resin A has a unit Y1 represented by formula (1) and a unit Y2 represented by formula (2),
wherein when a mass of the graft resin A is represented by X, a mass of the unit Y1 in the graft resin A is represented by Ma, and a mass of the unit Y2 in the graft resin A is represented by Mb, Ma, Mb, and X satisfy $0.90 \leq (Ma+Mb)/X \leq 1.00$ and $1.00 \leq Ma/Mb \leq 30.0$, and
wherein the graft resin B
(i) is a comb-shaped polymer having, as a branch, at least one moiety selected from the group consisting of: a styrene-based polymer moiety; a (meth)acrylate-based polymer moiety; and a styrene-acrylate-based polymer moiety, and
(ii) is free of a polysiloxane structure moiety or contains the polysiloxane structure moiety at a content of 0.1 mass % or less:

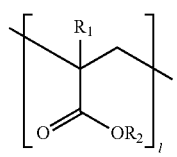

(1)

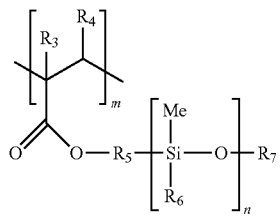

(2)

in formula (1) or formula (2),
$R_1$ represents H or $CH_3$,
$R_2$ represents a hydrocarbon group having 1 or more and 6 or less carbon atoms that may have a substituent, and the substituent is a hydroxy group or a carboxy group,
$R_3$ represents H or $CH_3$,
$R_4$ represents H or $CH_3$,
$R_5$ represents a single bond, or a hydrocarbon group having 1 or more and 6 or less carbon atoms,
$R_6$ represents a hydrocarbon group having 1 or more and 10 or less carbon atoms,
$R_7$ represents H, $CH_3$, or $Si(CH_3)_3$, and
l and m each represent an integer of 1 or more, and n represents an integer of 2 or more and 150 or less.

10. A developer for replenishment to be replenished into a developing unit in accordance with a reduction in toner concentration of a two-component developer in the developing unit, the developer for replenishment comprising:
a magnetic carrier; and
a toner,
wherein the magnetic carrier includes a magnetic core and a coating resin configured to coat a surface of the magnetic core,
wherein the coating resin contains a graft resin A and a graft resin B, wherein the coating resin
- (i) contains 1.0 mass % or more and 50.0 mass % or less of the graft resin A, and
- (ii) contains 50.0 mass % or more and 99.0 mass % or less of the graft resin B, wherein the graft resin A has a unit Y1 represented by formula (1) and a unit Y2 represented by formula (2), wherein when a mass of the graft resin A is represented by X, a mass of the unit Y1 in the graft resin A is represented by Ma, and a mass of the unit Y2 in the graft resin A is represented by Mb, Ma, Mb, and X satisfy $0.90 \leq (Ma+Mb)/X \leq 1.00$ and $1.00 \leq Ma/Mb \leq 30.0$, and wherein the graft resin B
- (i) is a comb-shaped polymer having, as a branch, at least one moiety selected from the group consisting of: a styrene-based polymer moiety; a (meth)acrylate-based polymer moiety; and a styrene-acrylate-based polymer moiety, and
- (ii) is free of a polysiloxane structure moiety or contains the polysiloxane structure moiety at a content of 0.1 mass % or less:

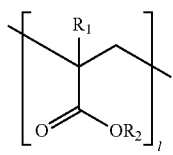
(1)

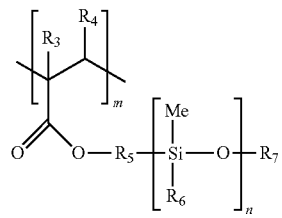
(2)

in formula (1) or formula (2), $R_1$ represents H or $CH_3$, $R_2$ represents a hydrocarbon group having 1 or more and 6 or less carbon atoms that may have a substituent, and the substituent is a hydroxy group or a carboxy group, $R_3$ represents H or $CH_3$, $R_4$ represents H or $CH_3$, $R_5$ represents a single bond, or a hydrocarbon group having 1 or more and 6 or less carbon atoms, $R_6$ represents a hydrocarbon group having 1 or more and 10 or less carbon atoms, $R_7$ represents H, $CH_3$, or $Si(CH_3)_3$, and l and m each represent an integer of 1 or more, and n represents an integer of 2 or more and 150 or less.

* * * * *